US011758257B2

(12) United States Patent
Schneider, Jr. et al.

(10) Patent No.: US 11,758,257 B2
(45) Date of Patent: Sep. 12, 2023

(54) RANDOM ACCESS SENSOR WITH INDIVIDUALLY ADDRESSABLE TRANSISTORS

(71) Applicant: PerkinElmer Health Sciences, Inc., Waltham, MA (US)

(72) Inventors: Charles Adams Schneider, Jr., New Haven, CT (US); Brian Klembara, Monroe, MA (US); Rafael Domínguez Castro, Seville (ES); Jesús Ruiz Amaya, Seville (ES); Jose Angel Segovia de la Torre, Seville (ES); Bruno Gili, La Motte Servolex (FR); Ana González Márquez, Seville (ES)

(73) Assignee: PerkinElmer U.S. LLC, Waltham, MA (US)

( * ) Notice: Subject to any disclaimer, the term of this patent is extended or adjusted under 35 U.S.C. 154(b) by 93 days.

(21) Appl. No.: 16/952,418

(22) Filed: Nov. 19, 2020

(65) Prior Publication Data
US 2021/0185199 A1    Jun. 17, 2021

Related U.S. Application Data

(60) Provisional application No. 62/947,579, filed on Dec. 13, 2019.

(51) Int. Cl.
*H04N 23/56* (2023.01)
*G01J 3/28* (2006.01)

(52) U.S. Cl.
CPC ............ *H04N 23/56* (2023.01); *G01J 3/2803* (2013.01)

(58) Field of Classification Search
CPC .... H04N 5/2256; H04N 5/3745; H04N 5/376; H04N 5/374; H04N 23/56; H04N 25/77; H04N 25/74; G01J 3/2803
See application file for complete search history.

(56) References Cited

U.S. PATENT DOCUMENTS

| 6,933,973 B1 * | 8/2005 | Sako ...................... H04N 5/374 348/E3.018 |
| 8,773,562 B1 | 7/2014 | Fan |
| 2013/0001404 A1 * | 1/2013 | Meynants .............. H04N 5/345 257/222 |

FOREIGN PATENT DOCUMENTS

| GB | 2492387 A | 1/2013 |
| JP | 2017123533 A | 7/2017 |

OTHER PUBLICATIONS

Jun. 23, 2022—(WO) International Preliminary Report on Patentability—App. No. PCT/US2020/063739.
Oct. 7, 2022 (IN) First Examination Report—App. No. 202247033787.

* cited by examiner

*Primary Examiner* — Nicholas G Giles
(74) *Attorney, Agent, or Firm* — Banner & Witcoff, Ltd.

(57) ABSTRACT

A circuit, e.g., a CMOS sensor, with individually addressable transfer transistors and individually addressable reset transistors is described. Through the individually addressable transistors, pixels within different regions of interest, of the same or different size and/or the same or different exposure times, can be efficiently processed. Different regions of interest may be exposed concurrently and read out independently.

36 Claims, 26 Drawing Sheets

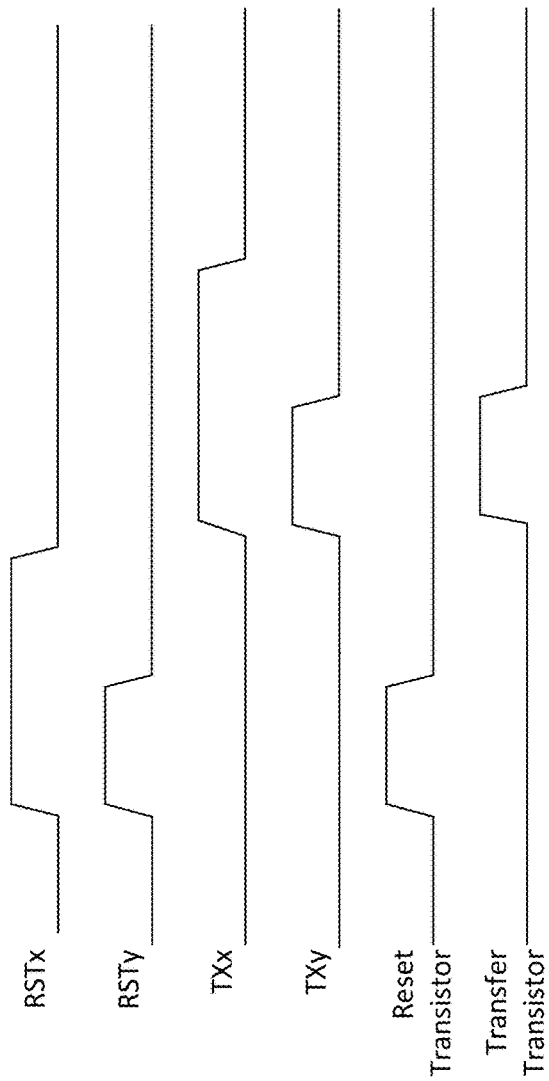
Figure 8
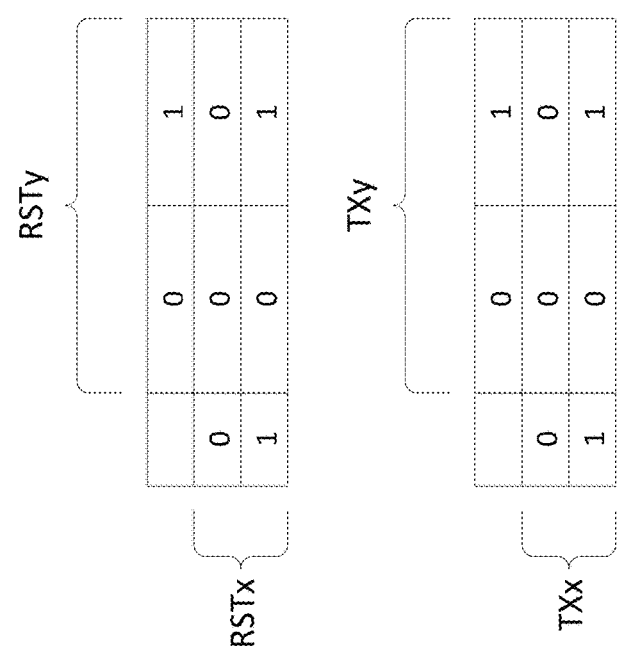
Figure 9A
Figure 9B

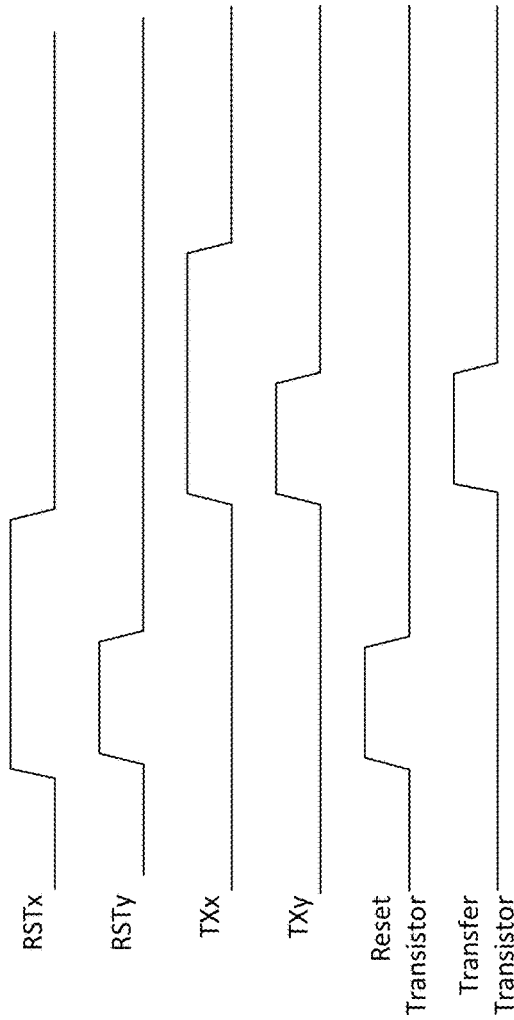
Figure 11
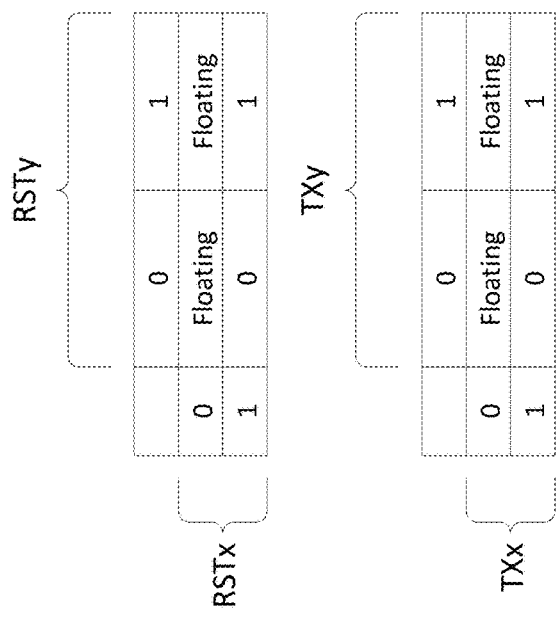
Figure 12A
Figure 12B

| RSTx | /RSTx | RSTy | RESET |
|---|---|---|---|
| 0* | 0* | 0 | Floating |
| 0* | 0* | 1 | Floating |
| 0 | 1 | 0 | 0 |
| 0 | 1 | 1 | 0 |
| 1 | 0 | 0 | 0 |
| 1 | 0 | 1 | 1 |
| 1* | 1* | 0 | Floating** |
| 1* | 1* | 1 | Floating** |

| TXx | /TXx | TXy | TRANSFER |
|---|---|---|---|
| 0* | 0* | 0 | Floating |
| 0* | 0* | 1 | Floating |
| 0 | 1 | 0 | 0 |
| 0 | 1 | 1 | 0 |
| 1 | 0 | 0 | 0 |
| 1 | 0 | 1 | 1 |
| 1* | 1* | 0 | Floating** |
| 1* | 1* | 1 | Floating** |

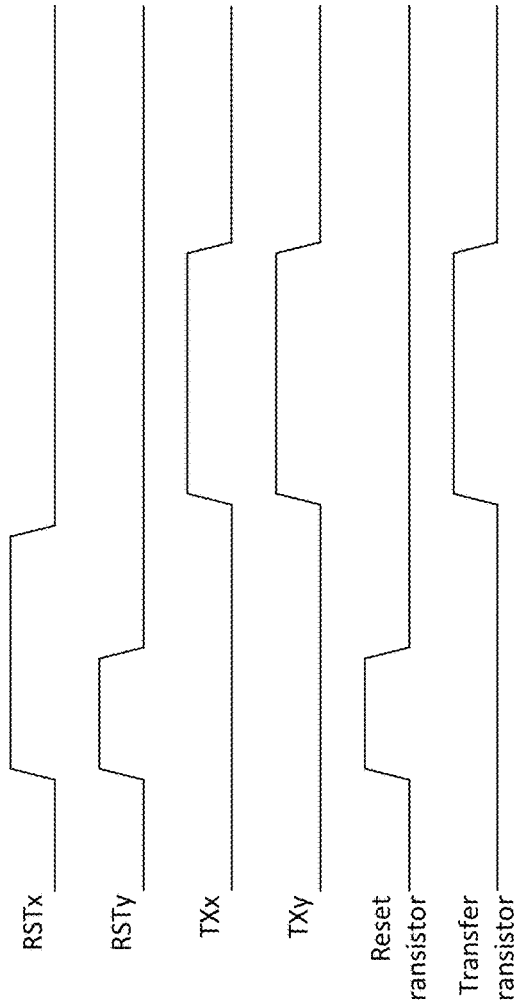
Figure 17
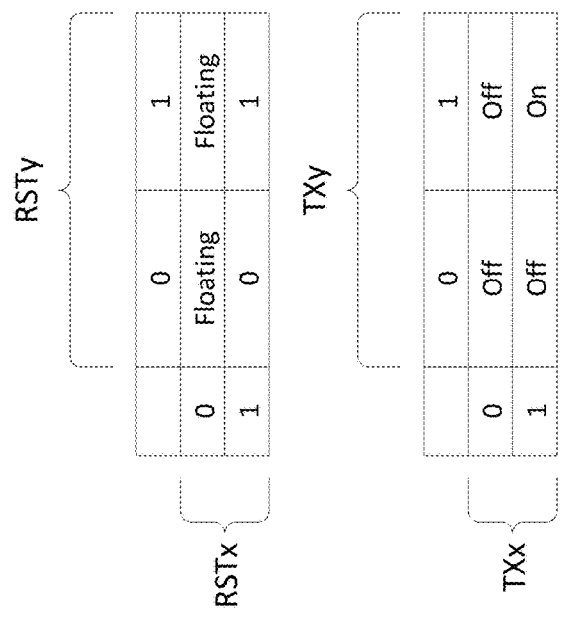
Figure 18A
Figure 18B

RANDOM ACCESS SENSOR WITH INDIVIDUALLY ADDRESSABLE TRANSISTORS

CROSS REFERENCE TO RELATED CASES

This application claims priority to co-pending provisional U.S. Application No. 62/947,579, entitled "Random Access Sensor" filed Dec. 13, 2019.

TECHNOLOGICAL FIELD

Various aspects of the disclosure relate to a randomly addressable sensor.

BACKGROUND

CMOS sensors are finding widespread use in image capturing environments. Pixel arrays in a CMOS sensor may be exposed using different techniques including a global shutter, in which all pixels are exposed simultaneously for the same exposure interval, and a rolling shutter, in which the pixels are exposed sequentially, often line-by-line. In photography and some video applications, rolling shutters can unnaturally skew images by incorporating movement artifacts. In other applications, the ability to quickly capture and read out captured data is of higher importance.

SUMMARY

The following summary presents a simplified summary of certain features. The summary is not an extensive overview and is not intended to identify key or critical elements.

Disclosed is a circuit, e.g., a CMOS sensor, with individually addressable transfer transistors and individually addressable reset transistors. Through the individually addressable transistors, pixels within different regions of interest, of the same or different size and/or the same or different exposure times, can be efficiently processed. Different regions of interest may be exposed concurrently and read out independently. As such, systems, apparatuses, and methods are described for a random access CMOS sensor. The CMOS sensor may include photodiodes, floating diffusion nodes, and transfer transistors connecting the photodiodes to the floating diffusion nodes. The transfer transistors may be selectable by two or more transfer select signals. The transfer select signals may be combined by one or more transistors connected to control the operation of the transfer transistors. By using two or more transfer select signals, the transfer transistors may be individually addressed. The output of the CMOS sensor may include a source-follower output. The CMOS sensor may include reset transistors and/or selection transistors in which the transistors may be controlled by two or more select signals. Using combinations of select signals, the related transistors may be individually addressed. The CMOS sensor may include one or more regions of interest (ROIs) in which each ROI is handled by one or more sets of control circuitry.

Accordingly, the present disclosure includes CMOS sensors, pixels, and/or circuits, including circuits comprising a first transfer transistor connecting a photodiode to a floating diffusion node, wherein the first transfer transistor is individually selectable by a combination of: (i) a first transfer select input, and (ii) a second transfer select input; an output transistor in a source-follower configuration with a gate connected to the floating diffusion node; and, a selection transistor connecting the output of the output transistor. In some embodiments, the circuit further comprises a first transfer selection transistor having a gate terminal connected to (i) the first transfer select input, or (ii) the second transfer select input, the first transfer selection transistor being connected between: (1) the gate terminal of the first transfer transistor, and (2) the other of: (a) the first transfer select input or (b) the second transfer select input.

In one or more aspects, the circuit further comprises an individually addressable first reset select input; an individually addressable second reset select input; a reset transistor connected between one or more potentials and the floating diffusion node; and, a first reset selection transistor having a gate terminal connected to: (i) the first reset select input, or (ii) the second reset select input, the first reset selection transistor otherwise being connected between (1) the gate terminal of the reset transistor, and (2) the other of: (a) the first reset select input, or (b) the second reset select input. The circuit may also comprise a second transfer selection transistor, wherein the second transfer selection transistor includes a gate terminal connected to a complement of (i) the first transfer select input or (ii) the second transfer select input, the second transfer selection transistor otherwise being connected between: (1) the gate terminal of the first transfer transistor, and (2) one or more potentials.

In some embodiments, the circuit further comprises a second reset selection transistor, wherein the second reset selection transistor has a gate terminal connected to a complement of one of (i) the first reset select input, or (ii) the second reset select input, the second reset selection transistor otherwise being connected between: (1) the gate terminal of the reset transistor, and (2) one or more of the potentials.

Also disclosed is a circuit that further comprises a transfer selection transistor having a gate terminal connected to one of (i) the first transfer select input, or (ii) the second transfer select input, the transfer selection transistor otherwise being connected between: (1) the gate terminal of the first transfer transistor, and (2) the other of (a) the first transfer select input or (b) the second transfer select input.

The circuits may further comprise an individually addressable first reset select input; an individually addressable second reset select input; a reset transistor connected between at least one potential and the floating diffusion node; and, a reset selection transistor having a gate terminal connected to one of (i) the first reset select input, or (ii) the second reset select input, the reset selection transistor being otherwise connected between: (1) the gate terminal of the reset transistor, and (2) the other of (a) the first reset select input, and (b) the second reset select input. In embodiments, the circuit comprises at least one anti-blooming transistor. In one or more embodiments, the circuit comprises at least one transfer selection control circuit configured to (i) individually address the first transfer select inputs, and (ii) individually address the second transfer select inputs.

The circuits herein may be used in, for example, a spectrometer system, and thus also disclosed are spectrometers comprising the circuits described herein.

Also disclosed are CMOS sensors, the CMOS sensors comprising at least one source-follower output; at least one transfer selection control circuit configured to control (i) individually addressable first transfer select inputs, and (ii) individually addressable second transfer select inputs; an array of pixels comprising: (a) photodiodes; (b) floating diffusion nodes; (c) transfer transistors connecting the photodiodes to the floating diffusion nodes, wherein the transfer transistors are individually selectable by the combination of the first transfer select inputs and second transfer select inputs; and (d) output transistors in a source-follower configuration connecting the floating diffusion nodes to output nodes; and, a controller configured to control the at least one transfer selection control circuit to expose: (i) a first pixel of the array of pixels for a first length of time, and (ii) a second pixel of the array of pixels for a second length of time, the second length of time being independent of the first length of time. In some embodiments, the first length of time is different from the second length of time, and/or while in some embodiments, the first length of time and the second length of time commence at different times.

The CMOS sensor may further comprise a multiplexer; and, a plurality of reading circuits, wherein: a first reading circuit is connected, during a first reading time, via the multiplexer to read a value on a first source-follower output, and, a second reading circuit is connected, during a second reading time, via the multiplexer, to read a value on a second source-follower output. In embodiments, the second reading time is independent of the first reading time.

It can thus be understood that the disclosed CMOS sensor can include embodiments wherein a first pixel and a second pixel are in a first row, wherein at least the first pixel is exposed for a first exposure time, and wherein at least the second pixel is exposed for a second exposure time, the second exposure time being independent of and/or different from the first exposure time. In some embodiments, a first pixel and a second pixel are in a first column, wherein at least the first pixel is exposed for a first exposure time, and wherein at least the second pixel is exposed for a second exposure time, the second exposure time being independent of and/or different from the first exposure time. In some CMOS sensors, the photodiodes are arranged between the transfer transistors and a light source, and in some systems, the light source is a light source of a spectrometer. Those of ordinary skill will thus recognize that the disclosed methods and systems apply to light sources that emit coherent and non-coherent light, and thus the sensor(s) may be monochromatic or chromatic, and the applications for the sensors may include, but are not limited to, sensing applications, imaging applications, and others.

Also disclosed is a CMOS sensor comprising at least one photodiode; at least one floating diffusion node; at least one output node; at least one individually addressable first transfer select input; at least one individually addressable second transfer select input; at least one transfer transistor connecting a first photodiode to a first floating diffusion node, wherein a first transfer transistor is individually selectable by the combination of: (i) one of the first transfer select inputs, and (ii) one of the second transfer select inputs; and, at least one output transistor in a source-follower configuration connecting the at least one first floating diffusion node to the at least one output node. The CMOS sensor may further comprise at least a first transfer selection transistor having a gate terminal connected to: (i) one of the first transfer select inputs, or (ii) one of the second transfer select inputs, the first transfer selection transistor otherwise being connected between (1) the gate terminal of the at least one first transfer transistor, and (2) the other of: (a) the first transfer select input, or (b) the second transfer select input. The CMOS sensor may further comprise at least one individually addressable first reset select input; at least one individually addressable second reset select input; at least one reset transistor connected between one or more potentials and the floating diffusion nodes; and at least a first reset selection transistor having a gate terminal connected to: (i) one of the first reset select inputs, or (ii) one of the second reset select inputs, the first reset selection transistor otherwise being connected between (1) the gate terminal of one of the reset transistors, and (2) the other of (a) the first reset select input, or (b) the second reset select input.

The disclosed CMOS sensors may further comprise a second transfer selection transistor, the second transfer selection transistor having a gate terminal connected to a complement of (i) one of the first transfer select inputs or (ii) one of the second transfer select inputs, the second transfer selection transistor otherwise being connected between (i) the gate terminal of the first transfer transistor, and (ii) one or more potentials. In embodiment, the CMOS sensor further comprises a second reset selection transistor, wherein the second reset selection transistor has a gate terminal connected to a complement of one of: (i) the first reset select input, or (ii) the second reset select input, the second reset selection transistor otherwise being connected between (i) the gate terminal of the first reset transistor, and (ii) one or more of the potentials.

The CMOS sensor can further comprise at least a first transfer selection transistor having a gate terminal connected to one of (i) the first transfer select input, or (ii) the second transfer select input, the first transfer selection transistor otherwise being connected between (i) the gate terminal of a first transfer transistor, and (ii) the other of (a) the first transfer select input or (b) the second transfer select input. The CMOS sensor, in embodiments, may further include at least one transfer selection transistor, wherein a first transfer selection transistor is connected in a source-follower configuration between a first photodiode and a first floating diffusion node. In some embodiments, the CMOS sensor further comprises at least one individually addressable first reset select input; at least one individually addressable second reset select input; at least one reset transistor connected between at least one potential and the floating diffusion nodes; and at least one reset selection transistor, a first reset selection transistor having a gate terminal connected to one of: (i) the first reset select input, or (ii) the second reset select input, the first reset selection transistors being otherwise connected between (1) the gate terminal of one of the reset transistors, and (2) the other of (a) the first reset select input, and (b) the second reset select input.

In some embodiments, the CMOS sensor further comprises at least one transfer selection control circuit configured to (i) individually address the first transfer select inputs, and (ii) individually address the second transfer select inputs.

In one or more embodiments, the CMOS sensor includes at least one anti-blooming transistor. The CMOS sensor can be utilized in a spectrometer system, and thus the present disclosure includes spectrometer systems that utilize a CMOS sensor as disclosed.

Also disclosed is a CMOS sensor comprising at least one output; at least one transfer selection control circuit configured to control (i) individually addressable first transfer select inputs, and (ii) individually addressable second transfer select inputs; an array of pixels comprising: (a) photodiodes; (b) floating diffusion nodes; (c) transfer transistors connecting the photodiodes to the floating diffusion nodes; wherein the transfer transistors are individually selectable by the combination of the first transfer select input and second transfer select inputs; and, (d) output transistors in a source-follower configuration connecting the floating diffusion nodes to the at least one output; and a controller configured to control the at least one transfer selection control circuit to expose: (1) a first pixel of the array of pixels for a first length of time, and, (2) a second pixel of the array of pixels for a second length of time, the second length of time being independent of the first length of time. In some embodiments, the first length of time is different from the second length of time, and/or the first length of time and the second length of time commence at different times.

In one or more embodiments, the CMOS sensor further comprises a multiplexer; and a plurality of reading circuits (e.g., plurality of single analog-to-digital converter channels), wherein: a first reading circuit is connected, during a first reading time, via the multiplexer to read a value on a first source-follower output, and a second reading circuit is connected, during a second reading time, via the multiplexer to read a value on a second source-follower output. The second reading time can be independent of the first reading time.

In some embodiments, a first pixel and a second pixel are in a first row, wherein at least the first pixel is exposed for a first exposure time, and wherein at least the second pixel is exposed for a second exposure time, the second exposure time being independent of the first exposure time. The first pixel and/or the second pixel can be in a first column, wherein at least the first pixel is exposed for a first exposure time, and at least the second pixel is exposed for a second exposure time, the second exposure time being independent of the first exposure time. In embodiments, the photodiodes are arranged between the transfer transistors and a light source, where in some embodiments, light from the light source is modified by the optical components of a spectrometer. These and other features and advantages are described in greater detail below.

BRIEF DESCRIPTION OF THE SEVERAL VIEWS OF THE DRAWINGS

Some features are shown by way of example, and not by limitation, in the accompanying drawings. In the drawings, like numerals reference similar elements.

FIG. 8 shows an example timing diagram of a CMOS sensor with two transfer select signals and two reset select signals.

FIG. 9A shows an example logic table for the operation of a reset transistor using two reset select signals. FIG. 9B shows an example logic table for the operation of a transfer transistor using two transfer select signals.

FIG. 11 shows one example timing diagram of the CMOS sensor of FIG. 10B.

FIG. 12A shows an example logic table for the operation of the reset transistor of FIG. 10B. FIG. 12B shows an example logic table for the operation of the transfer transistor of FIG. 10B.

FIG. 17 shows one example timing diagram for the pixel of FIG. 16B.

FIG. 18A shows an example logic table for the reset transistor of FIG. 16B. FIG. 18B shows a logic table for the transfer transistor of FIG. 16B.

Figure 1:
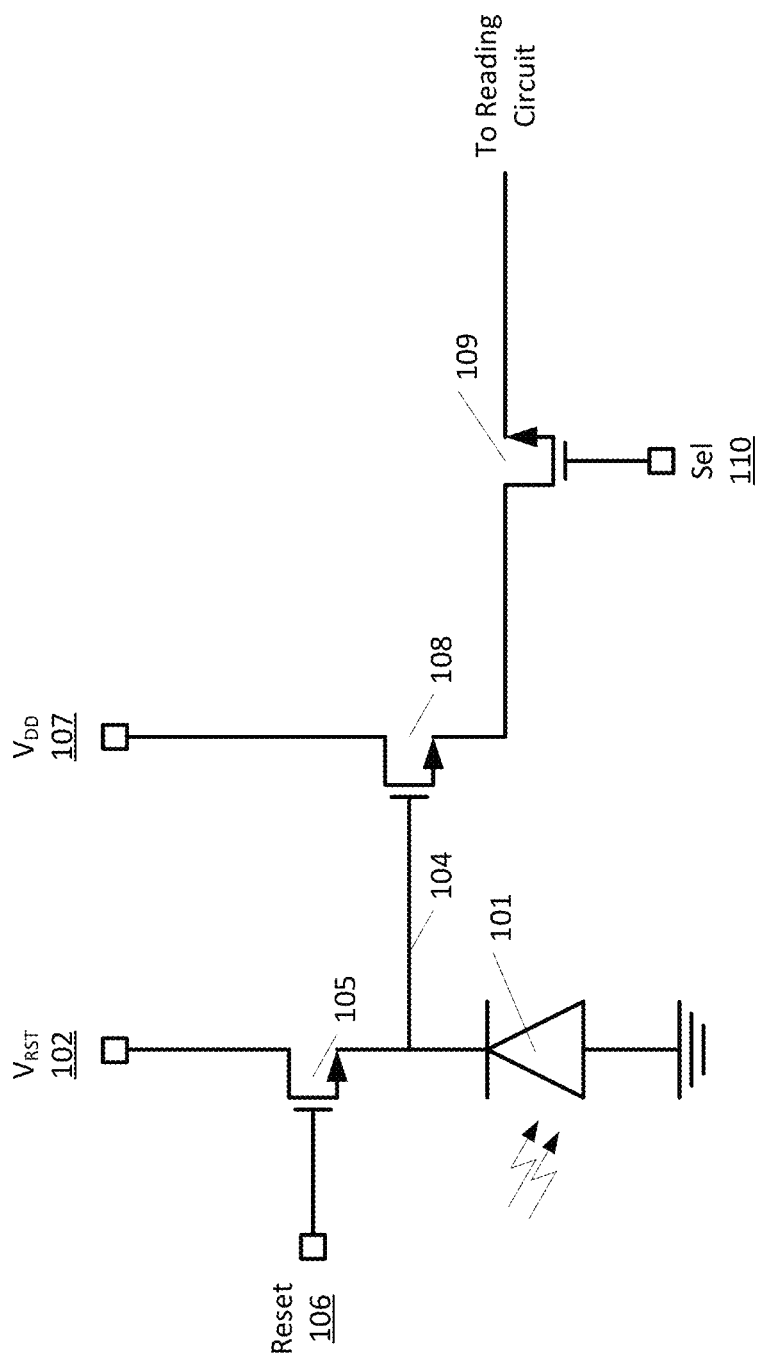
FIG. 1 shows a circuit/pixel of a CMOS sensor with three transistors.

It will be recognized by the skilled person in the art, given the benefit of this disclosure, that the exact arrangement, sizes and positioning of the components in the figures is not necessarily to scale or required. The particular sizes and angles of one component relative to another component may vary to provide a desired response or output from the component or the optical spectrometer system comprising the component.

DETAILED DESCRIPTION

The accompanying drawings, which form a part hereof, show examples of the disclosure. It is to be understood that the examples shown in the drawings and/or discussed herein are non-exclusive and that there are other examples of how the disclosure may be practiced Optical sensors are used in various applications and across industries. Charge coupled devices (CCDs) have been used since the 1970s. Recently, CMOS sensors have become more prevalent based on CMOS sensors being faster and generally less expensive than CCD sensors.

A random access CMOS sensor may be used in a variety of environments including those environments in which high speed sensing of regions of interest (ROI) is required. For example, a random access CMOS sensor may be used in diagnostic or testing equipment including, but not limited to, spectrometers, high-speed cameras, and remote sensors. With respect to spectrometers, the random access CMOS sensor may be used to capture light at multiple wavelengths. Because the locations of the light output from a spectrometer may be known ahead of time (e.g., based on the configuration of the spectrometer), the ROIs may be limited to those specific areas where the light is expected to be received across the pixel array.

CMOS pixels, like other light sensing devices, may be used as light intensity measuring devices when the pixels are properly exposed. Overexposing or underexposing a pixel may prevent light from being accurately measured by the pixel. A random access CMOS pixel, using the techniques shown in the figures and described in the accompanying text, permits one or more of variable exposure times and/or use of different ROIs in a high-speed environment. For purposes of explanation, the term "pixel" is used to describe picture elements in a sensor array in which each pixel includes a photodiode or other photosensitive device. The term "circuit" is used to describe a combination of components. For example, the term "circuit" may be used to describe an addressable collection of devices in a sensor array, in which the collection of devices may or may not include a photodiode or other photosensitive device.

FIG. 1 includes a photodiode 101 connected between a potential (e.g., ground) and an output transistor in a source-follower configuration. The gate of the output transistor 108 (in this disclosure, it can be understood that all references to an "output transistor" may refer to a transistor in a source-follower configuration) connects to a terminal of the photodiode 101 and to a drain of a reset transistor 105, where the reset transistor 105 is controlled by a reset signal 106 connected to its gate. The source of the reset transistor 105 is connected to a potential shown as $V_{RST}$ 102. In FIG. 1, a floating diffusion node 104 is located at the gate of output transistor 108. A selection transistor 109 connects a terminal (source/drain) of output transistor 108 to one or more output lines (one or more output nodes) leading to a reading circuit (not shown). It shall be understood herein that a reading circuit corresponds to a single analog-to-digital converter ("ADC") channel. The selection transistor 109 may be controlled by a select signal 110 connected to the gate of the selection transistor 109. In FIG. 1 and the remaining figures of the disclosure, the transistors may be of similar or disparate types (including p-type, n-type, or combination thereof). For purposes herein, the term "gate" when used with respect to a terminal of a transistor is intended to refer to the gate terminal of the transistor. Also, the term "output nodes" may be used to describe the output of selection transistors (e.g., selection transistor 109 or other selection transistors described herein). It can thus be understood that the select signal 110 can be a signal that is associated with e.g., a row selection in an array of pixels, while the reading circuit signal can be a signal that can be associated with e.g., a column of an array of pixels, or vice-versa.

The CMOS pixel of FIG. 1 may be described as having various operational states including: a reset state (B) in which charges on the output of the photodiode 101 and/or floating diffusion node 104 are reset; an exposure state (Exp) during which the photodiode 101 is permitted to charge a terminal of the output transistor 108; and a read-out state (RO) during which the output transistor 108 transfers the potential difference between $V_{DD}$ 107 and the photodiode 101 to a terminal (e.g., source/drain) of selection transistor 109. The selection transistor 109 may be operated to permit the reading circuit to read the potential selectively supplied to selection transistor 109 by output transistor 108 (based on the accumulated charges on the gate of output transistor 108).

The Figures of the disclosed methods and systems include the use of one or more potentials, and it can be understood that such potentials may be different; however, in some embodiments, they may be the same.

Figure 2:
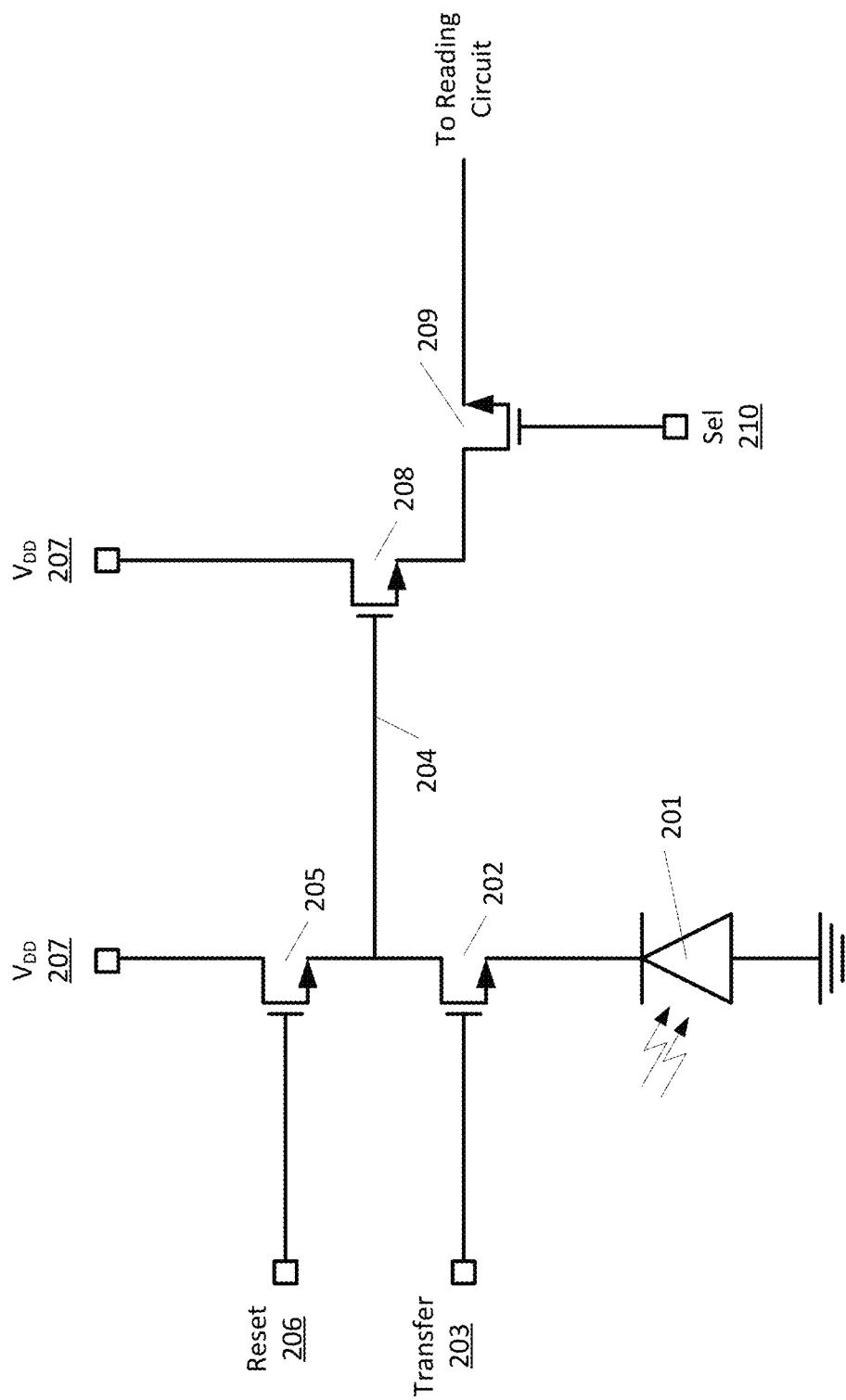
FIG. 2 shows a circuit/pixel of a CMOS sensor with four transistors.

FIG. 2 shows a circuit similar to that of FIG. 1 but including an additional transfer transistor 202 positioned between a floating diffusion node 204 and a photodiode 201, which is in turn connected to a potential (e.g., ground). The transfer transistor 202 may be controlled by a transfer signal 203 connected to the gate of the transfer transistor 202. The transfer transistor 202 connects the photodiode 201 to a floating diffusion node 204. A reset transistor 205 may connect the floating diffusion node 204 with a constant potential, represented in FIG. 2 as $V_{DD}$ 207. The reset transistor 205 may be controlled by a reset signal 206 connected to the gate of the reset transistor 205. A gate of an output transistor 208 may be connected to the floating diffusion node 204 and a terminal (e.g., source/drain) of the output transistor 208 may be connected to a terminal of a selection transistor 209. The other terminal of the output transistor 208 may be connected to a constant potential (here, $V_{DD}$ 207). The selection transistor 209 connects the terminal of the output transistor 208 to one or more output lines leading to a reading circuit (not shown). The selection transistor 209 may be controlled by a select signal 210 connected to the gate of the selection transistor 209. The output transistor 208 (as also shown in FIG. 1, 108) provides a high impedance to the floating diffusion node 204, thereby permitting a more consistent read operation across an array of pixels. The addition of transfer transistor 202 permits inclusion of another reset state (e.g., reset state (F) in which the floating diffusion node 204 is reset (e.g., to remove dark current, parasitic sensitivity, etc.). Thus, four states may be identified with FIG. 2: a reset state (B) (during which charges on the output of photodiode 201 and/or floating diffusion node 204 are reset), an exposure state (Exp) (during which the photodiode 201 is permitted to accumulate charge), a reset state (F) (during which the floating diffusion node is reset), and a read-out state (RO) (during which charge accumulated by the photodiode 201 is transferred to the floating diffusion node).

Figure 3:
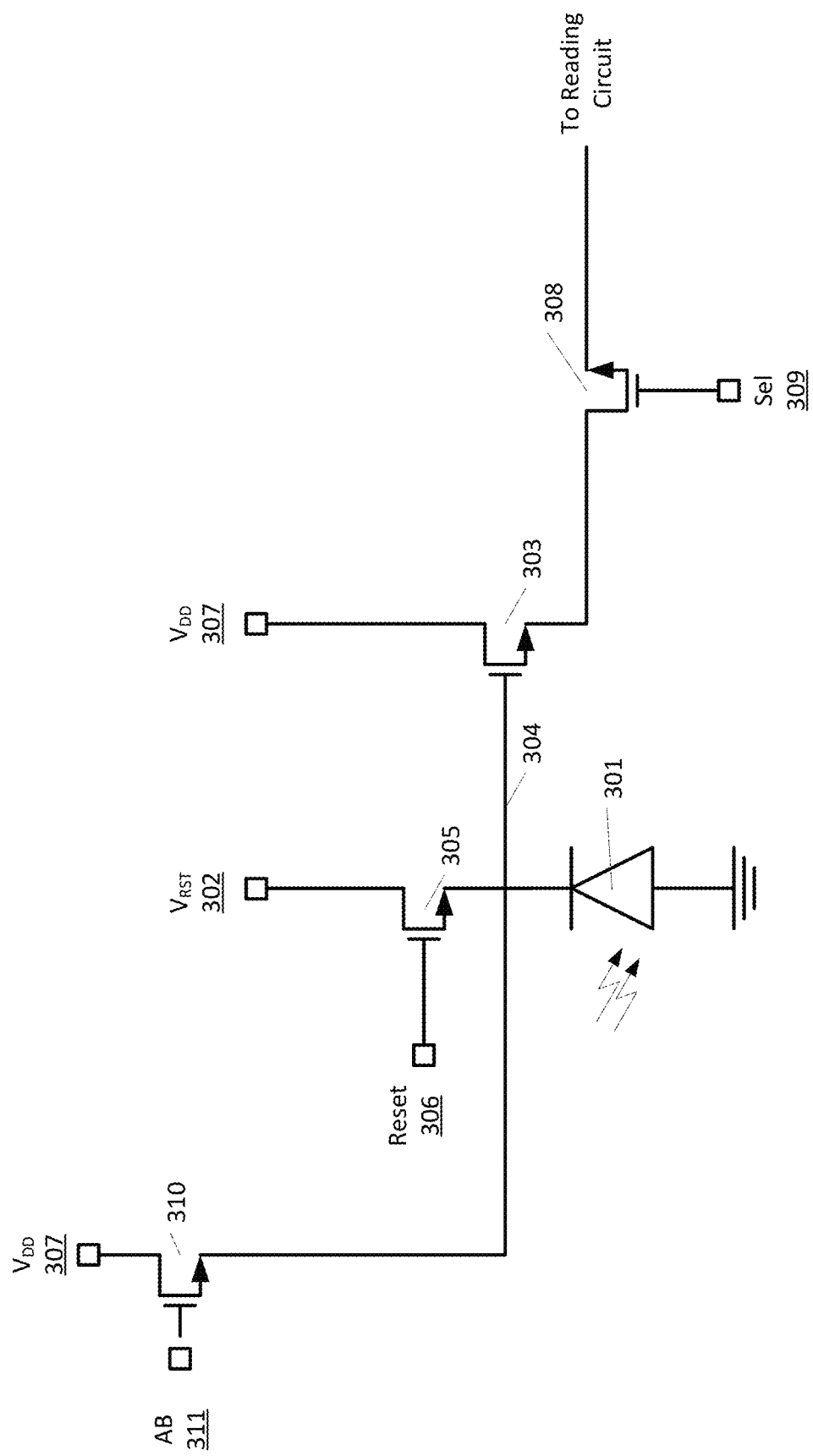
FIG. 3 shows a circuit/pixel of a CMOS sensor with an anti-blooming transistor.

FIG. 3 shows a pixel according to FIG. 1, but with an anti-blooming connection. An anti-blooming transistor 310 may be connected between the photodiode 301 and a constant voltage potential (here, $V_{DD}$ 307). An anti-blooming signal 311 may be connected to the gate of the anti-blooming transistor 310.

In some applications, the entire pixel array may be operated to obtain an image illuminating the array. In other applications, only specific regions of interest (ROIs) may be desired to be monitored. By reducing the number of pixels to be activated during operation of the CMOS sensor and the corresponding state control of each pixel (e.g., reset, exposed, reset, and read out), the effective speed of the CMOS sensor may be increased. For example, in some applications, an entire row may be selected for exposure. The row may be exposed as part of a global shutter or a rolling shutter. An issue with e.g., exposing an entire row, is the inability to subsequently expose other pixels on the same row for a different period of time. Similar issues exist when e.g., attempting to read pixels that share a common column, as attempting to read two pixels in the same column at the same time creates a "collision" between the reading states of the pixels (i.e., charges from the two pixels are fed to a common column at the same time, thereby preventing a reading circuit from distinguishing between the charges of the two pixels). A similar issue may exist for collisions occurring when attempting to read data from pixels in the same row.

Figure 4:
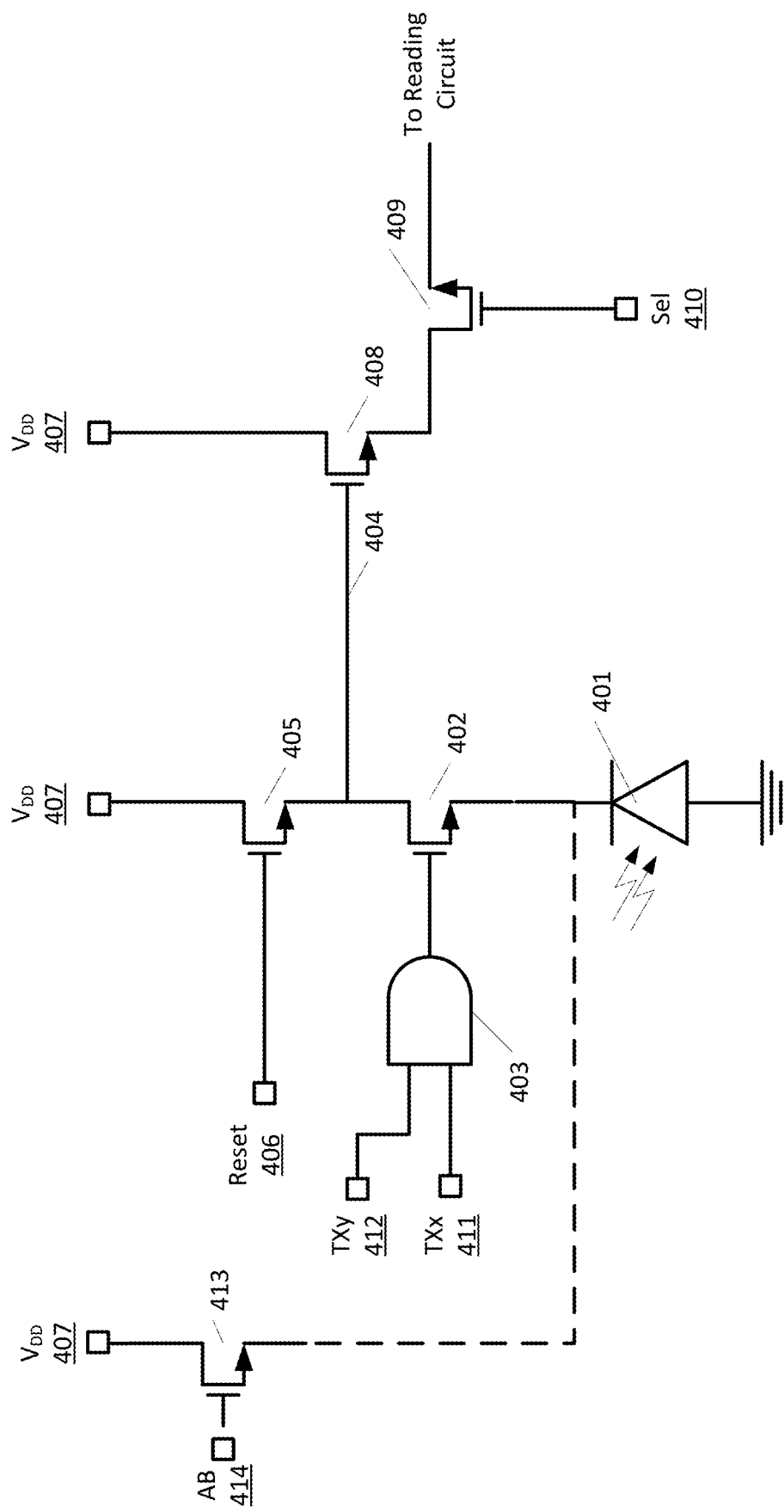
FIG. 4 shows a circuit/pixel of a CMOS sensor with two transfer select signals and an optional anti-blooming transistor.

As described in relation to FIG. 4 and subsequent figures, the disclosed systems and methods include a CMOS sensor array that allows for individualized pixel control. As shown in FIG. 4, such systems, methods, and/or circuits may achieve this through the use of a rolling shutter that exposes selected portions of the CMOS sensor array at a time where a transfer transistor and/or reset transistor may be controlled by more than one transfer select signal, or more than one reset select signal. As such, rolling shutters for individual pixels may have overlapping exposure times or non-overlapping exposure times. Depending on the control circuitry, readout intervals may be concatenated or permitted to overlap each other. For example, for a given ROI, similar waveforms may be used to control the various transfer, reset, and select transistors. Those similar waveforms may or may not be shifted in time from each other.

FIG. 4 shows a pixel with a gate of a transfer transistor controlled by two transfer select signals, TXx 411 and TXy 412. FIG. 4 includes a photodiode 401 connected between a potential (e.g., ground) and a transfer transistor 402. The transfer transistor 402 may be controlled by a transfer signal connected to the gate of the transfer transistor 402. As shown, two or more transfer select signals (TXx 411 and TXy 412) driving the gate of the transfer transistor 402 are thus used in combination to control the transfer transistor 402 and hence the functionality of the pixel, independent of the other pixels, including those that may be in the same row and/or column. As shown in FIG. 4, functionally, the two or more transfer select signals, TXx 411 and TXy 412, can be understood to be inputs to the equivalent of an AND logic gate 403, although it can be understood that this functionality can be achieved in many different ways, and the FIG. 4 AND gate 403 is merely a representation of such functionality. The transfer transistor 402 connects the photodiode 401 to a floating diffusion node 404. An optional anti-blooming transistor 413 can connect the photodiode 401 to a potential (e.g., $V_{DD}$ 407), and the gate of the anti-blooming transistor 413 can be driven by an anti-blooming select signal 414. A reset transistor 405 may connect the floating diffusion node 404 with a constant potential, represented in FIG. 4 as $V_{DD}$ 407. The reset transistor 405 may be controlled by a reset signal 406 connected to the gate of the reset transistor 405. A gate of an output transistor 408 may be connected to the floating diffusion node 404 and a terminal (e.g., source/drain) of the output transistor 408 may be connected to a terminal of a selection transistor 409. The other terminal of the output transistor 408 may be connected to a constant potential (here, $V_{DD}$ 407). The selection transistor 409 connects a terminal of the output transistor 408 to one or more output lines leading to a reading circuit (not shown). The selection transistor 409 may be controlled by a select signal 410 connected to the gate of the selection transistor 409.

Benefits of having multiple transfer select lines includes one or more of the following: individual control of pixels, allowing each pixel to be individually addressed; increasing the flexibility of when specific ROIs are enabled to be reset, exposed, reset, and read out; controlling collisions during these operations by permitting ordering of the states per ROI across a CMOS sensor; increasing the flexibility of ROIs on the CMOS sensor by permitting ROIs to have different sizes, locations, and exposure times; increasing the flexibility of the readout times per ROI; and increasing the flexibility of the number of states available per ROI.

Figure 5:
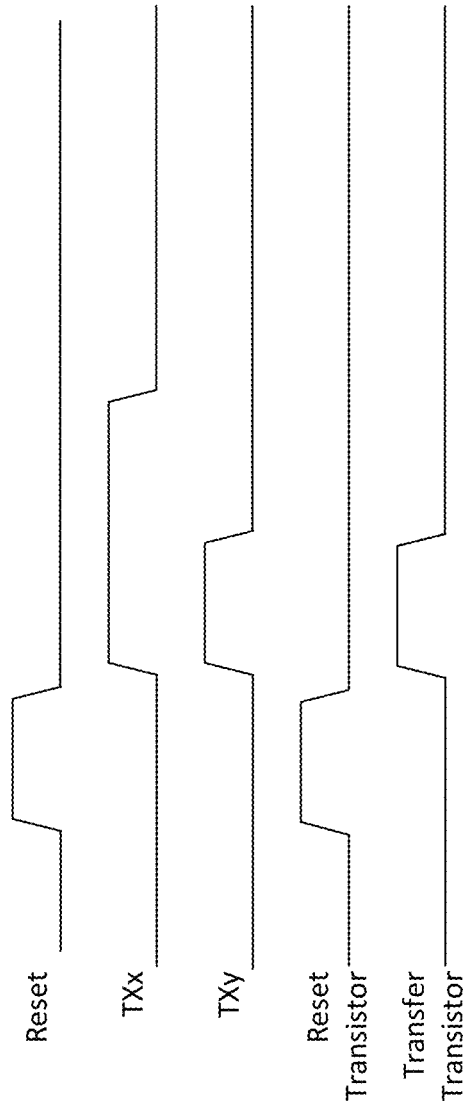
FIG. 5 shows one example timing diagram of a CMOS sensor with two transfer select signals.

FIG. 5 shows one example timing diagram for a CMOS sensor according to FIG. 4. FIG. 5 includes reset signal 406, a first transfer select signal TXx 411, and a second transfer select signal TXy 412. FIG. 5 also shows the operation of the reset transistor 405 in response to the reset signal 406. When the reset signal 406 changes from a first level to a second level (shown in FIG. 5 as transitioning from a low-voltage state to a high-voltage state), the reset transistor is turned on.

FIG. 5 further shows the operation of transfer transistor 402 in response to the combination of the first and second transfer select signals TXx 411 and TXy 412. When both the first and second transfer select signals TXx 411 and TXy 412 are in the high-voltage state, the transfer transistor turns on. However, when one or both of the transfer select signals TXx 411 and TXy 412 are in the low-voltage state, the transfer transistor is off.

The transistors shown in the figures and described in the specification may be edge-triggered, level-triggered or combination of both. Accordingly, for example, with respect to FIG. 5, the reset transistor and/or the transfer transistor may only turn on with the respective triggering method.

Figure 6:
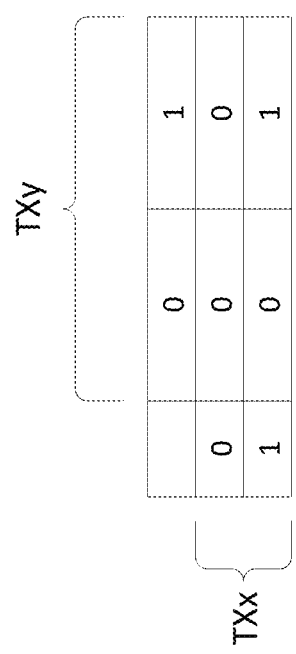
FIG. 6 shows an example logic table of the operation of a transfer transistor using two transfer select signals.

FIG. 6 shows an example of a logic table of the operation of the transfer transistor of FIG. 4 using the two transfer select signals. Two possible values {0,1} for the first TXx transfer select signal are shown as row identifiers in the table of FIG. 6 and two possible values {0,1} for the second TXy transfer select signal are shown as column identifiers in the table of FIG. 6. When at least one of the transfer select signals is {0}, the transfer transistor is off. When both of the transfer select signals is {1}, the transfer transistor is on.

Figure 7:
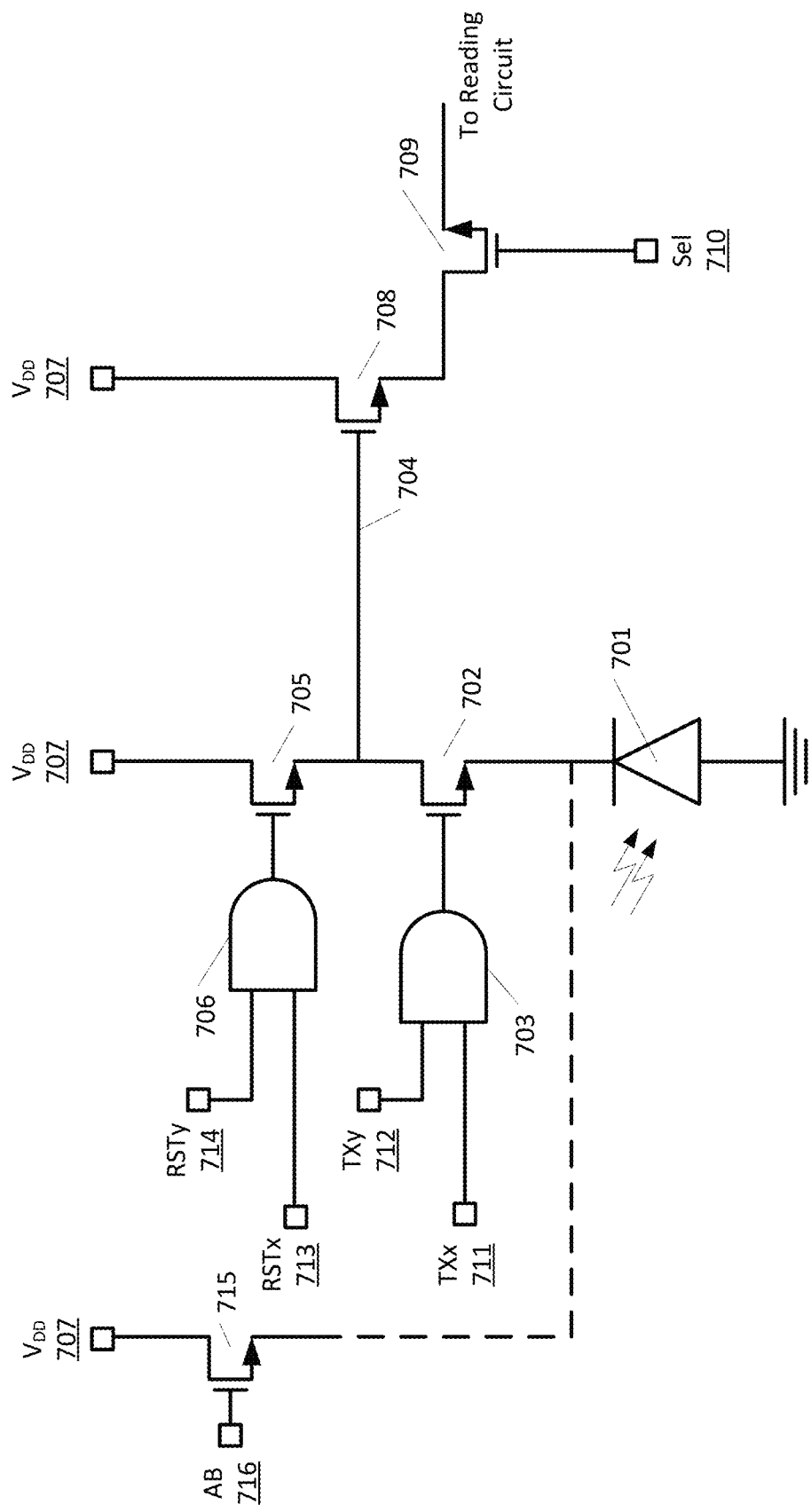
FIG. 7 shows a circuit/pixel of a CMOS sensor with two transfer select signals and two reset select signals and an optional anti-blooming transistor.

FIG. 7 shows a circuit that can be, e.g., a pixel of a CMOS sensor, with a gate of a transfer transistor 702 controlled by two transfer select signals and a gate of a reset transistor 705 controlled by two reset select signals, thereby allowing for individualized transfer and reset of the pixel relative to other pixels in the array. FIG. 7 includes a photodiode 701 connected between a potential (e.g., ground) and a transfer transistor 702. Optionally, the photodiode 701 can be additionally connected to an anti-blooming transistor 715 that can be driven by an anti-blooming select signal 716. The transfer transistor 702 may be controlled by a transfer signal (represented functionally in FIG. 7 as an AND logic gate 703) connected to the gate of the transfer transistor 702. The transfer transistor 702 connects the photodiode 701 to a floating diffusion node 704. A reset transistor 705 may connect the floating diffusion node 704 with a constant potential, represented in FIG. 7 as $V_{DD}$ 707. The reset transistor 705 may be controlled by a reset signal (represented functionally in FIG. 7 as an AND logic gate 706) connected to the gate of the reset transistor 705. A gate of an output transistor 708 may be connected to the floating diffusion node 704 and a terminal (e.g., source/drain) of the output transistor 708 may be connected to a terminal of a selection transistor 709. The other terminal of the output transistor 708 may be connected to a constant potential (here, $V_{DD}$ 707). The selection transistor 709 connects the terminal of the output transistor 708 to one or more output lines leading to a reading circuit (not shown). The selection transistor 709 may be controlled by a select signal 710 connected to the gate of the selection transistor 709. The AND logic gate 703 may receive as inputs two or more transfer select signals, represented by first and second transfer select signals TXx 711 and TXy 712. By using two or more transfer select signals for a given transfer transistor, the transfer transistor may be individually addressed as compared to addressing solely an entire row (or column) of transfer transistors. The FIG. 7 reset select AND logic gate 706 may receive as inputs two or more reset select signals, represented by first and second reset select signals RSTx 713 and RSTy 714. By using two or more reset select signals for a given reset transistor, the reset transistor may be individually addressed as compared to addressing solely an entire row (or column) of reset transistors.

FIG. 8 shows one example timing diagram in accordance with a circuit, e.g., pixel of a CMOS sensor, according to FIG. 7, with two transfer select signals and two reset select signals. With reference to the FIG. 7 circuit, FIG. 8 includes a first reset select signal RSTx 713, a second reset select signal RSTy 714 being a different width (or in a "high" state for a different (e.g., longer or shorter) period of time) than the first reset signal RSTx 713, a first transfer select signal TXx 711, and a second transfer select signal TXy 712 being a different width (or in a "high" state for a different period of time) as the first transfer select signal TXx 711, although it can be understood that the first and second reset select signals RSTx and RSTy, as well as the first and second transfer select signals TXx and TXy, may be the same width/duration (or "high" for the same amount of time), or a different (e.g., relatively "longer" or "shorter") width/duration (e.g., the RST transistors relative to the TX transistors or the RSTx/TXx transistors relative to the RSTy/TXy transistors). Accordingly, as with the various example timing diagrams provided herein, it may be found that other variations of the timing diagrams may be more suitable to a particular application, and the present disclosure shall not be limited by such timing diagram examples.

FIG. 8 shows the operation of the reset transistor 705 in response to the shown first and second reset signals RSTx 713 and RSTy 714. As illustrated, when both the reset select signals RSTx 713 and RSTy 714 are in the high-voltage state, the reset transistor is on. However, when one or both of the reset select signals RSTx 713 and RSTy 714 are in the low-voltage state, the reset transistor is off. In some embodiments such as the example embodiment of FIGS. 7 and 8, it may be determined that TXx is higher for a longer period of time than TXy, and similarly, RSTx is higher for a longer period of time than RSTy.

FIG. 8 further shows the operation of transfer transistor 702 in response to the combination of transfer select signals TXx 711 and TXy 712. When both the transfer select signals TXx 711 and TXy 712 are in the high-voltage state, the transfer transistor is on. However, when one or both of the transfer select signals TXx 711 and TXy 712 are in the low-voltage state, the transfer transistor is off.

FIG. 9A shows an example logic table for the operation of the reset transistor in response to the first and second reset select signals 713, 714. Two values {0,1} for the RSTx reset select signal are shown as row identifiers in the table of FIG. 9A and two values {0,1} for the RSTy reset select signal are shown as column identifiers in the table of FIG. 9A. When at least one of the reset select signals is {0}, the reset transistor is off. When both of the reset select signals is {1}, the reset transistor is on.

FIG. 9B shows an example logic table for the operation of the transfer transistor in response to the transfer select signals. Two values {0,1} for the TXx transfer select signal are shown as row identifiers in the table of FIG. 9B and two values {0,1} for the TXy transfer select signal are shown as column identifiers in the table of FIG. 9B. When at least one of the transfer select signals is {0}, the transfer transistor is off. When both of the transfer select signals is {1}, the transfer transistor is on.

Figure 10A:
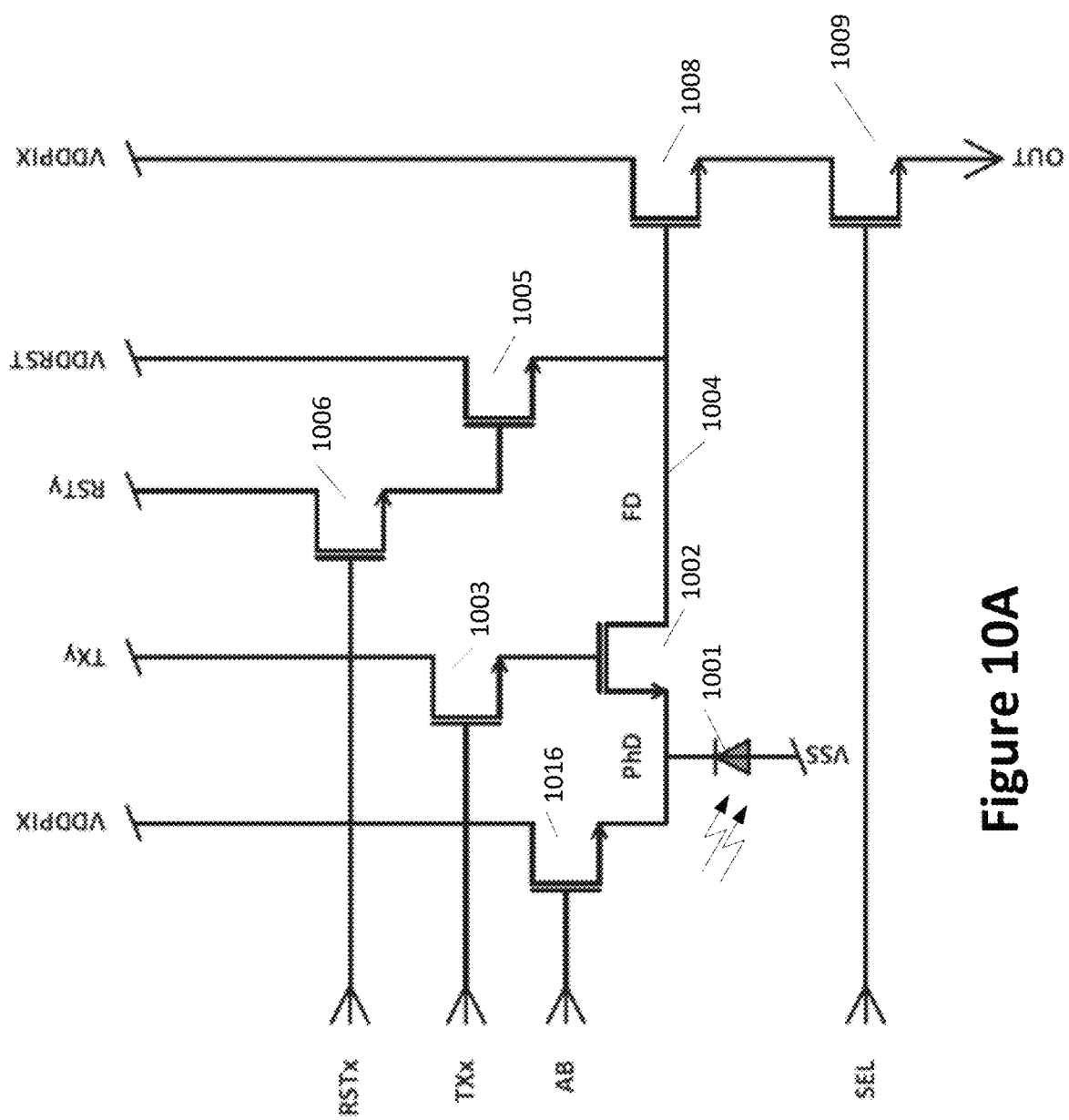
FIG. 10A shows a circuit/pixel of a CMOS sensor with separate transistors controlling the operation of a transfer transistor and a reset transistor.

FIG. 10A shows a circuit, e.g., a pixel of a CMOS sensor, in accordance with the circuit of FIG. 7, however, with the functionality of the AND gates replaced with transistors. In the FIG. 10A embodiment, separate transistors control the operation of a transfer transistor 1002 and a reset transistor 1005. As will be described herein, in the FIG. 10A embodiment, the transfer transistor 1002 and reset transistor 1005 are "floating." FIG. 10A includes a photodiode 1001 connected between a potential (e.g., VSS) and the transfer transistor 1002. The transfer transistor 1002 is connected between the photodiode 1001 and a floating diffusion node 1004. The gate of the transfer transistor 1002 is connected to the output of a transfer selection transistor 1003. A gate of the transfer selection transistor 1003 receives a first transfer select signal TXx. The transfer selection transistor 1003 is connected between the gate of transfer transistor 1002 and a second transfer select signal TXy. Similarly, the reset transistor 1005 is connected between the floating diffusion node 1004 and a potential (e.g., VDDrst). A gate of a reset selection transistor 1006 receives a first reset select signal RSTx. The reset selection transistor 1006 is connected between a gate of the reset transistor 1005 and a second reset select signal RSTy. An output transistor 1008 is connected between a potential (e.g., VDDpix) and a selection transistor 1009. The gate of the output transistor 1008 is connected to the floating diffusion node 1004. The selection transistor 1009 is connected between the output transistor 1008 and reading circuitry (not shown). The gate of the selection transistor 1009 receives a select signal SEL. An optional anti-blooming transistor 1016 is connected between the photodiode 1001 and a potential (e.g., VDDpix). A gate of the anti-blooming transistor 1016 receives an anti-blooming select signal AB.

Figure 10B:
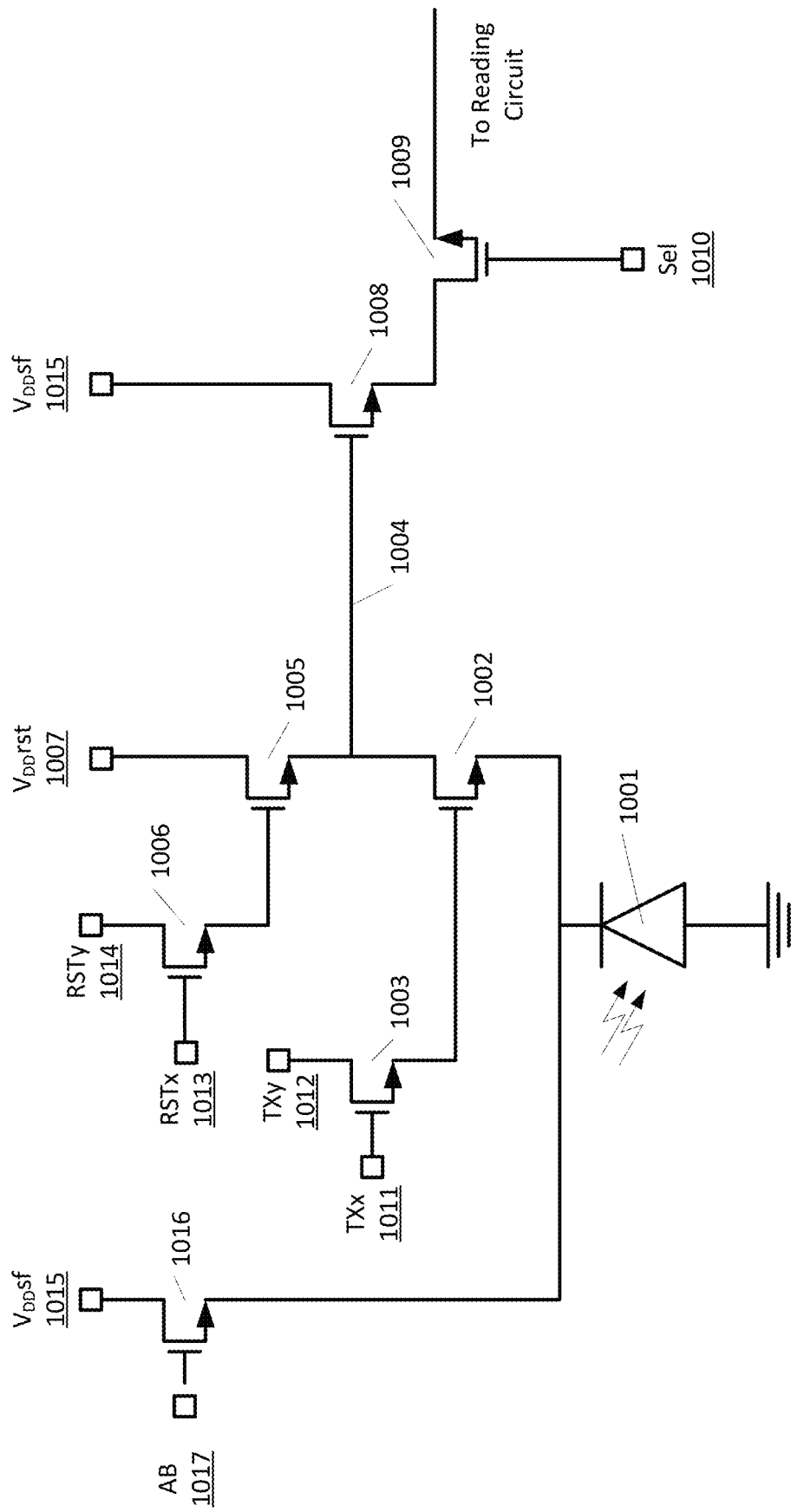
FIG. 10B shows an alternative view of the circuit/pixel of FIG. 10A with additional annotations.

FIG. 10B shows an alternative view of the pixel of FIG. 10A with additional annotations. FIG. 10B includes a photodiode 1001 connected between a potential (e.g., ground) and a transfer transistor 1002. The transfer transistor 1002 may be controlled by the output of a transfer selection transistor 1003 connected to the gate of the transfer transistor 1002. The transfer transistor 1002 connects the photodiode 1001 to a floating diffusion node 1004. A reset transistor 1005 may connect the floating diffusion node 1004 with a constant potential, represented in FIG. 10B as VDDrst 1007. The reset transistor 1005 may be controlled by a reset selection transistor 1006 connected to the gate of the reset transistor 1005. A gate of an output transistor 1008 may be connected to the floating diffusion node 1004 and a terminal (e.g., source/drain) of the output transistor 1008 may be connected to a terminal of a selection transistor 1009. The other terminal of the output transistor 1008 may be connected to a constant potential (here, VDDsf 1015). The constant potentials VDDrst 1007 and VDDsf 1015 may be the same or different. The selection transistor 1009 connects the terminal of the output transistor 1008 to one or more output lines leading to a reading circuit (not shown). The selection transistor 1009 may be controlled by a select signal 1010 connected to the gate of the selection transistor 1009. The transfer selection transistor 1003 may receive as inputs two or more transfer select signals, represented by transfer select signals TXx 1011 and TXy 1012. For example, a gate of the transfer selection transistor 1003 may receive the transfer select signal TXx 1011 and have its remaining terminal (e.g., the other of the source/drain not connected to the gate of the transfer transistor 1002) connected to the transfer select signal TXy 1012. By using two or more transfer select signals for a given transfer selection transistor 1003, the transfer transistor 1002 may be individually addressed as compared to addressing solely an entire row of transfer transistors. The reset selection transistor 1006 may receive as inputs two or more reset select signals, represented by reset select signals RSTx 1013 and RSTy 1014. For example, a gate of the reset selection transistor 1006 may receive the reset select signal RSTx 1013 and have its remaining terminal (e.g., the other of the source/drain not connected to the gate of the reset transistor 1005) connected to the reset select signal RSTy 1014. By using two or more reset select signals for a given reset transistor, the reset transistor 1005 may be individually addressed as compared to addressing solely an entire row of reset transistors. FIG. 10B also includes an optional anti-blooming transistor 1016 connected to the photodiode 1001. The other end of anti-blooming transistor 1016 may be connected to a constant potential (e.g., VDDsf 1015). A gate of the anti-blooming transistor 1016 may receive an anti-blooming signal AB 1017.

FIG. 11 shows an example timing diagram in accordance with the FIG. 10 circuit, e.g., CMOS sensor, with first and second transfer select signals 1011, 1012 and first and second reset select signals 1013, 1014. FIG. 11 includes a reset select signal RSTx 1013, a reset select signal RSTy 1014, a transfer select signal TXx 1011, and transfer select signal TXy 1012. FIG. 11 shows the operation of the reset transistor 1005 in response to the reset signal (the output of the reset selection transistor 1006). When both the reset select signals RSTx 1013 and RSTy 1014 are in a high-voltage state, the reset transistor is on. However, when one or both of the reset select signals RSTx 1013 and RSTy 1014 are in a low-voltage state, the reset transistor is off.

FIG. 11 further shows the operation of transfer transistor 1002 in response to the combination of transfer select signals TXx 1011 and TXy 1012. When both the transfer select signals TXx 1011 and TXy 1012 are in a high-voltage state, the transfer transistor is on. However, when one or both of the transfer select signals TXx 1011 and TXy 1012 are in a low-voltage state, the transfer transistor is off.

For circuits, e.g., pixels, according to FIGS. 10A and 10B, it can be understood that the example RSTx is shown with the same width (e.g., in a high state for the same amount of time) as TXx, and RSTy is shown with the same width as TXy, although such an embodiment is only illustrative, and other relationships between the various TX and RST signals may be used as determined by the use of the circuit. Additionally, for the example embodiment, as shown in FIG. 11, RSTx, connected to the gate of the reset selection transistor 1006, may be longer (e.g., in a high state for a longer period of time) than the signal RSTy connected to the source of the reset selection transistor 1006, although such example embodiment is only illustrative. Similarly, as also shown in FIG. 11, TXx, connected to the gate of the transfer selection transistor 1003, may be longer (e.g., in a high state for a longer period of time) than the signal TXy connected to the source of the transfer selection transistor 1003.

FIG. 12A shows an example logic table for the operation of the reset selection transistor, and hence reset transistor, using the first and second reset select signals. Two values {0,1} for the RSTx reset select signal are shown e.g., as row identifiers in the table of FIG. 12A and two values {0,1} for the RSTy reset select signal are shown e.g., as column identifiers in the table of FIG. 12A. When the RSTx signal is {0}, the reset selection transistor is floating. When the RSTx signal is {1} and the RSTy signal is {0}, the reset selection transistor is off (represented by a {0}). When both of the reset select signals is {1}, the reset selection transistor, and hence the reset transistor, is on (represented by a {1}).

FIG. 12B shows an example logic table for the operation of the transfer selection transistor using first and second transfer select signals. FIG. 12B shows an example of a logic table of the operation of the transfer selection transistor of FIG. 10B using the first and second transfer select signals. Two values {0,1} for the TXx transfer select signal are shown as e.g., row identifiers in the table of FIG. 12B and two values {0,1} for the TXy transfer select signal are shown as e.g., column identifiers in the table of FIG. 12B. When the TXx signal is {0}, the transfer selection transistor is floating. When the TXx signal is {1} and the TXy signal is {0}, the transfer selection transistor is off (represented by a {0}). When both of the transfer select signals are {1}, the transfer selection transistor, and hence the transfer transistor, is on (represented by a {1}).

Figure 13A:
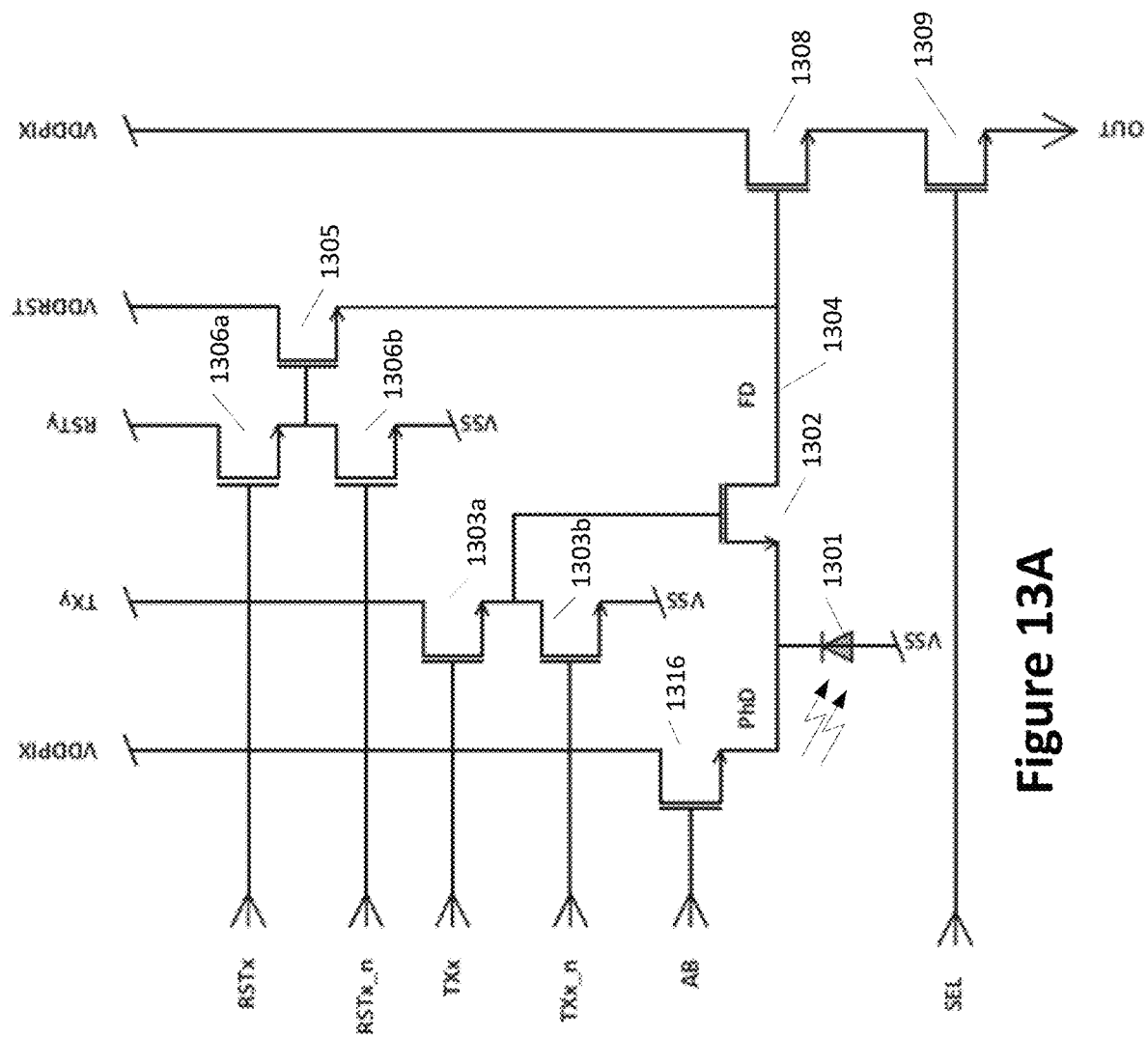
FIG. 13A shows a circuit/pixel with a transfer transistor controlled by two transistors.

FIG. 13A shows an embodiment of a circuit, e.g., a pixel of a CMOS sensor, similar to FIG. 10A, except that the transfer and reset transistors are not floating, but biased. As shown in FIG. 13A, there is a transfer transistor 1302 controlled by two transfer selection transistors 1303a, 1303b and a reset transistor 1305 controlled by two reset selection transistors 1306a, 1306b. FIG. 13A includes a photodiode 1301 connected between a potential (e.g., VSS) and the transfer transistor 1302. The transfer transistor 1302 is connected between the photodiode 1301 and the floating diffusion node 1304. The gate of the transfer transistor 1302 is connected to the output of a first transfer selection transistor 1303a. A gate of the first transfer selection transistor 1303a receives a first transfer select signal TXx. The first transfer selection transistor 1303a is connected between the gate of transfer transistor 1302 and a second transfer select signal TXy. A second transfer selection transistor 1303b is connected between the gate of the transfer transistor 1302 and a potential (e.g., VSS). The second transfer selection transistor 1303b is connected to a complement of the first transfer select signal (e.g., TXx_n). Also shown is a reset transistor 1305 connected between the floating diffusion node 1304 and a potential (e.g., VDDrst). A gate of a first reset selection transistor 1306a receives a first reset select signal RSTx. The first reset selection transistor 1306a is connected between a gate of the reset transistor 1305 and a second reset select signal RSTy. A second reset selection transistor 1306b is connected between the gate of the reset transistor 1305 and a potential (e.g., VSS). The second reset selection transistor 1306b is connected to a complement of the first reset select signal (e.g., RSTx_n). An output transistor 1308 is connected between a potential (e.g., VDDpix) and a selection transistor 1309. The gate of the output transistor 1308 is connected to the floating diffusion node 1304. The selection transistor 1309 is connected between the output transistor 1308 and reading circuitry (not shown). The gate of the selection transistor 1309 receives a select signal SEL. An optional anti-blooming transistor 1316 is connected between the photodiode 1301 and a potential (e.g., VDDpix). A gate of the anti-blooming transistor 1316 receives an anti-blooming select signal AB.

Figure 13B:
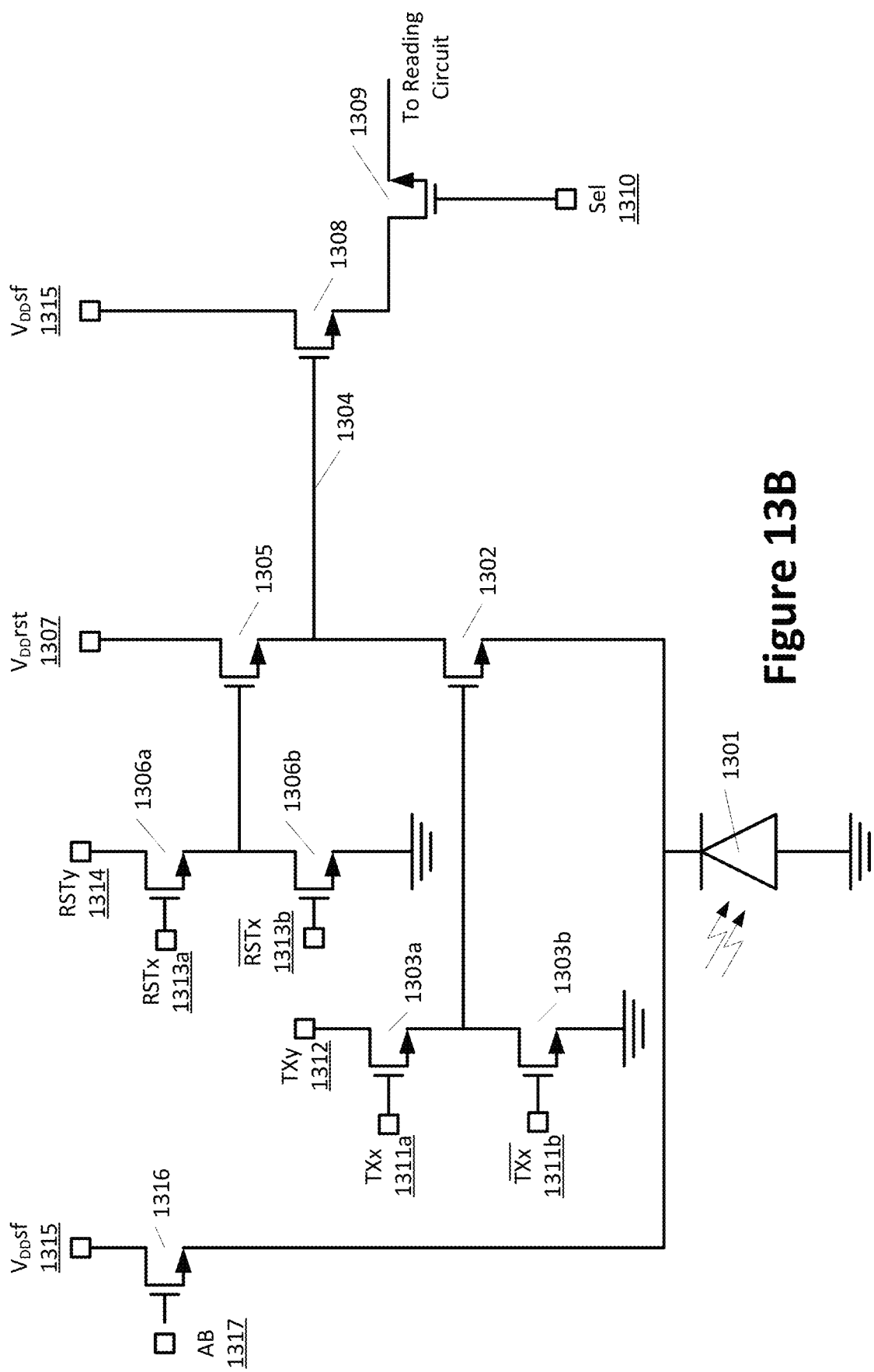
FIG. 13B shows an alternative view of the circuit/pixel of FIG. 13A with additional annotations.

FIG. 13B shows an alternative view of the circuit (e.g., pixel) of FIG. 13A with additional annotations. FIG. 13B includes a photodiode 1301 connected between a potential (e.g., ground) and a transfer transistor 1302. The transfer transistor 1302 may be controlled by the output of a transfer selection transistor 1303a connected to the gate of the transfer transistor 1302. The transfer transistor 1302 connects the photodiode 1301 to a floating diffusion node 1304.

A reset transistor 1305 may connect the floating diffusion node 1304 with a constant potential, represented in FIG. 13B as VDDrst 1307. The reset transistor 1305 may be controlled by a reset selection transistor 1306a connected to the gate of the reset transistor 1305. A gate of an output transistor 1308 may be connected to the floating diffusion node 1304 and a terminal (e.g., source/drain) of the output transistor 1308 may be connected to a terminal of a selection transistor 1309. The other terminal of the output transistor 1308 may be connected to a constant potential (here, VDDsf 1315). The constant potentials VDDrst 1307 and VDDsf 1315 may be the same or different. The selection transistor 1309 connects the terminal of the output transistor 1308 to one or more output lines leading to a reading circuit (not shown). The selection transistor 1309 may be controlled by a select signal 1310 connected to the gate of the selection transistor 1309. The transfer selection transistor 1303a may receive as inputs two or more transfer select signals, represented by transfer select signals TXx 1311a and TXy 1312. For example, a gate of the transfer selection transistor 1303a may be connected to the transfer select signal TXx 1311a and have its remaining terminal (e.g., the other of the source/drain not connected to the gate of the transfer transistor 1302) connected to the transfer select signal TXy 1312. FIG. 13B includes another transfer selection transistor 1303b connected between the gate of transfer transistor 1302 and a constant potential (e.g., ground). The gate of the transfer selection transistor 1303b may be connected to a complement of transfer select signal TXx 1311a (namely, a transfer select signal/TXx 1311b). By using two or more transfer select signals for a given transfer transistor, the transfer transistor may be individually addressed as compared to addressing solely an entire row (or column) of transfer transistors.

The transfer selection transistors 1303a and 1303b may be the same type of transistor (p-type or n-type). Additionally or alternatively, the transfer selection transistors 1303a and 1303b may be different types of transistors (one p-type and one n-type). By the transfer selection transistors 1303a and 1303b being different types of transistors, the same transfer select signal TXx 1311a may be applied to the gates of the two transfer selection transistors. With a high gate voltage, one turns on and the other turns off. Similarly, with a low gate voltage, one turns off and the other turns on. This approach reduces adding a separate inverter to create the complementary/TXx 1311b signal.

The reset selection transistor 1306a may be connected to two or more reset select signals, represented by reset select signals RSTx 1313a and RSTy 1314. For example, a gate of the reset selection transistor 1306a may be connected to the reset select signal RSTx 1313a and have its remaining terminal (e.g., the other of the source/drain not connected to the gate of the reset transistor 1305) connected to the reset select signal RSTy 1314. FIG. 13B includes another reset selection transistor 1306b connected between the gate of reset transistor 1305 and a constant potential (e.g., ground). The gate of the reset selection transistor 1306b may be connected to a complement of reset select signal RSTx 1313a (namely, a reset select signal/RSTx 1313b). By using two or more reset select signals for a given reset transistor, the reset transistor may be individually addressed as compared to addressing solely an entire row (or column) of reset transistors.

The reset selection transistors 1306a and 1306b may be the same type of transistor (p-type or n-type). Additionally or alternatively, the reset selection transistors 1306a and 1306b may be different types of transistors (one p-type and one n-type). By the reset selection transistors 1306a and 1306b being different types of transistors, the same reset select signal RSTx 1313a may be applied to the gates of the two reset selection transistors. With a high gate voltage, one turns on and the other turns off. Similarly, with a low gate voltage, one turns off and the other turns on. This approach reduces adding a separate inverter to create the complementary/RSTx 1313b signal.

FIG. 13B also includes an optional anti-blooming transistor 1316 connected to photodiode 1301. The other end of anti-blooming transistor 1316 may be connected to a constant potential (e.g., VDDsf 1315). A gate of the anti-blooming transistor 1316 may receive an anti-blooming signal AB 1317.

Figures 14, 15A, 15B:
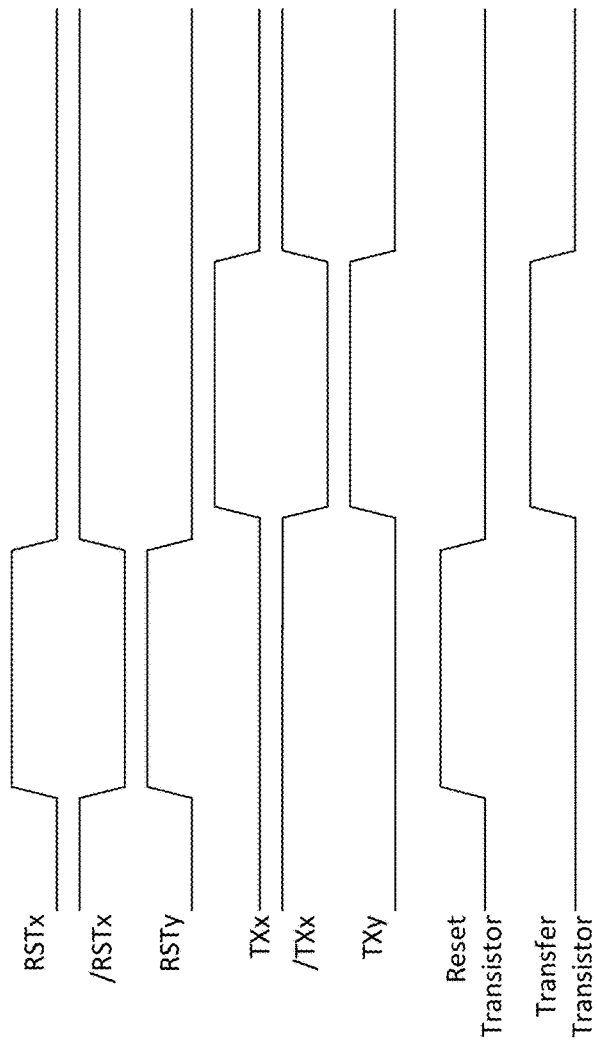
FIG. 14 shows an example timing diagram for the pixel of FIG. 13B.
FIG. 15A shows an example logic table for the reset transistor of FIG. 13B.
FIG. 15B shows an example logic table for the transfer transistor of FIG. 13B.

FIG. 14 shows one timing diagram of a circuit, e.g., CMOS sensor, with two transfer select signals and two reset select signals according to FIG. 13B. FIG. 14 includes a reset select signal represented by RSTx and its complement/RSTx, a reset select signal RSTy, a transfer select signal represented by TXx and its complement/TXx, and transfer select signal TXy. FIG. 14 shows the operation of the reset transistor 1305 in response to the reset signal (the output of the reset selection transistor 1306a and the reset selection transistor 1306b). When the reset select signals RSTx 1313a and RSTy 1314 are in the high-voltage state and the reset select signal/RSTx 1313b is in the low-voltage state, the reset transistor is on. However, when reset select signal RSTx is in the low-voltage state and the reset select signal/RSTx is in the high-voltage state, the reset transistor 1305 is off. Similarly, when the reset select signal RSTy is in the low-voltage state, the reset transistor 1305 is off.

FIG. 14 further shows the operation of transfer transistor 1302 in response to the transfer signal (the output of the transfer selection transistor 1303a and the transfer selection transistor 1303b). When the transfer select signals TXx 1311a and TXy 1312 are in the high-voltage state and the transfer select signal/TXx 1311b is in the low-voltage state, the transfer transistor is on. However, when transfer select signal TXx is in the low-voltage state and the transfer select signal/TXx is in the high-voltage state, the transfer transistor 1302 is off. Similarly, when the transfer select signal TXy is in the low-voltage state, the transfer transistor is off. It can be understood that although FIG. 14 shows transfer select signals TXx and TXy having the same length/duration in a high-voltage/potential state, such equivalence of duration is not required and may be different between the two signals.

FIG. 15A shows an example logic table for the operation of the reset transistor using the reset select signals. For purposes of explanation, a full logic table is shown for the reset select signals RSTx 1313a/RSTx 1313b, and RSTy 1314, each having values {0,1}. When the RSTx signal is {0} and the/RSTx signal is {1}, the reset transistor is off (represented by {0}). When the RSTx signal is {1}, the/RSTx signal is {0}, and the RSTy signal is {0}, the reset transistor is off (represented by a {0}). When the RSTx and RSTy signals are {1} and the/RSTx signal is {0}, the reset transistor is on (represented by a {1}). Rows in which RSTx and/RSTx have the same value include single asterisks "*" following the values of each to identify that the signals being supplied to the gates of reset selection transistors 1306a and 1306b are not always complementary (namely, they may be the same, e.g., when derived from different sources). In these rows, the reset transistor is identified as floating. Further, in rows with double asterisks "", the reset selection transistors 1306a and 1306**b are both on and may result in a high current draw.

FIG. 15B shows an example logic table for the operation of the transfer transistor using the transfer select signals. For purposes of explanation, a full logic table is shown for the transfer select signals TXx 1311a/TXx 1311b, and TXy 1312, each having values {0,1}. When the TXx signal is {0} and the/TXx signal is {1}, the transfer transistor is off (represented by {0}). When the TXx signal is {1}, the/TXx signal is {0}, and the TXy signal {0}, the transfer transistor is off (represented by a {0}). When the TXx and TXy signals are {1} and the/TXx signal is {0}, the transfer transistor is on (represented by a {1}). Rows in which TXx and/TXx have the same value include single asterisks "*" following the values of each to identify that the signals being supplied to the gates of transfer selection transistors 1303a and 1303b are not always complementary (namely, they may be the same, e.g., when derived from different sources). In these rows, the transfer transistor is identified as floating. Further, in rows with double asterisks "", the transfer selection transistors 1303a and 1303**b are both on and may result in a high current draw.

Figure 16A:
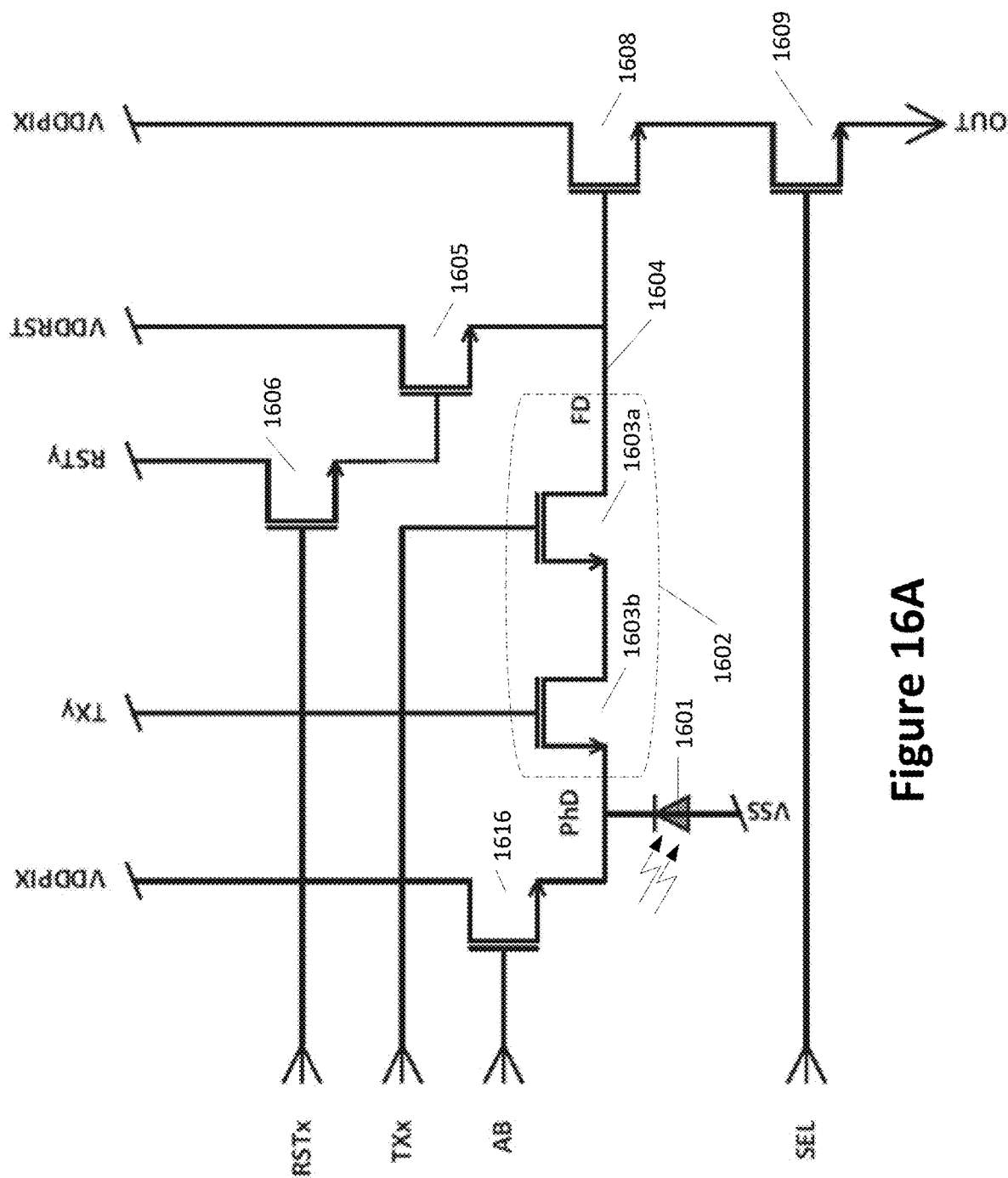
FIG. 16A shows a circuit/pixel with two transfer transistors.

FIG. 16A shows another embodiment of a circuit, e.g., a pixel, similar to that shown in FIG. 13A, except the transfer transistor is shown by a first transfer circuit 1602 whose functionality is shown for explanatory purposes with two transfer transistors 1603a, 1603b. It can be understood that in embodiments, the transfer circuit 1602 can be implemented using a single transistor with two gate pins. FIG. 16A includes a photodiode 1601 connected between a potential (e.g., VSS) and transfer circuit 1602. The transfer circuit 1602 is connected between the photodiode 1601 and a floating diffusion node 1604. The transfer circuit 1602 may be one or more transfer transistors, each controlled by a transfer select signal. For example, the transfer circuit 1602 (shown in FIG. 16A as an area defined by a dashed line) may include a series connection of a first transfer circuit selection transistor 1603a and a second transfer circuit selection transistor 1603b. The first transfer circuit selection transistor 1603a may receive, at its gate, a transfer select signal TXx. The second transfer circuit selection transistor 1603b may receive, at its gate, a transfer select signal TXy. A reset transistor 1605 is connected between the floating diffusion node 1604 and a potential (e.g., VDDrst). A gate of a reset selection transistor 1606 receives a first reset select signal RSTx. The reset selection transistor 1606 is connected between a gate of the reset transistor 1605 and a second reset select signal RSTy. An output transistor 1608 is connected between a potential (e.g., VDDpix) and a selection transistor 1609. The gate of the output transistor 1608 is connected to the floating diffusion node 1604. The selection transistor 1609 is connected between the output transistor 1608 and reading circuitry (not shown). The gate of the selection transistor 1609 receives a select signal SEL. An optional anti-blooming transistor 1616 is connected between the photodiode 1601 and a potential (e.g., VDDpix). A gate of the anti-blooming transistor 1616 receives an anti-blooming select signal AB.

Figure 16B:
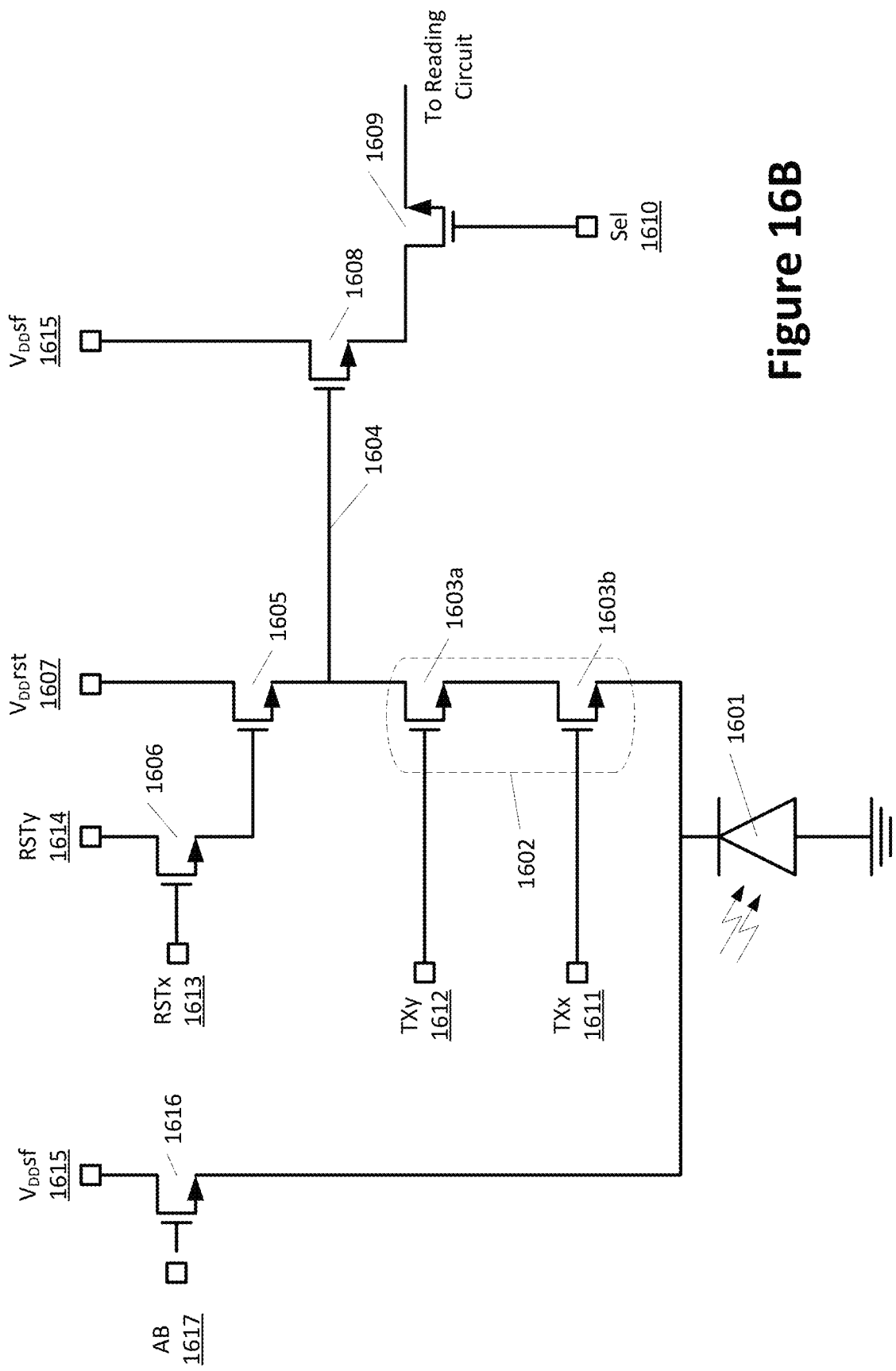
FIG. 16B shows an alternative view of the circuit/pixel of FIG. 16A with additional annotations.

FIG. 16B is an alternative view of the circuit, e.g., pixel of FIG. 16A with additional annotations. FIG. 16B includes a photodiode 1601 connected between a potential (e.g., ground) and a transfer circuit 1602. The transfer circuit 1602 connects the photodiode 1601 to a floating diffusion node 1604. A reset transistor 1605 may connect the floating diffusion node 1604 with a constant potential, represented in FIG. 16B as VDDrst 1607. The reset transistor 1605 may be controlled by a reset selection transistor 1606 connected to the gate of the reset transistor 1605. A gate of an output transistor 1608 may be connected to the floating diffusion node 1604 and a terminal (e.g., source/drain) of the output transistor 1608 may be connected to a terminal of a selection transistor 1609. The other terminal of the output transistor 1608 may be connected to a constant potential (here, VDDsf 1615). The constant potentials VDDrst 1607 and VDDsf 1615 may be the same or different. The selection transistor 1609 connects the terminal of the output transistor 1608 to one or more output lines leading to a reading circuit (not shown). The selection transistor 1609 may be controlled by a select signal 1610 connected to the gate of the selection transistor 1609.

The second transfer circuit selection transistor 1603b may receive, at its gate, a transfer select signal TXx 1611, and as described previously, the first transfer circuit selection transistor 1603a may receive, at its gate, a transfer select signal TXy 1612. By using two or more transfer select signals for a given transfer transistor, the transfer transistor may be individually addressed as compared to addressing solely an entire row (or column) of transfer transistors.

The reset selection transistor 1606 may receive as inputs two or more reset select signals, represented by reset select signals RSTx 1613 and RSTy 1614. For example, a gate of the reset selection transistor 1606 may receive the reset select signal RSTx 1613 and have its remaining terminal (e.g., the other of the source/drain not connected to the gate of the reset transistor 1605) connected to the reset select signal RSTy 1614. Alternatively, the reset transistor 1605 may be a reset circuit comprising two reset transistors in a configuration similar to the transfer circuit 1602. By using two or more reset select signals for a given reset transistor, the reset transistor may be individually addressed as compared to addressing solely an entire row (or column) of reset transistors.

FIG. 16B also includes an optional anti-blooming transistor 1616 connected to photodiode 1601. The other end of anti-blooming transistor 1616 may be connected to a constant potential (e.g., VDDsf 1615). A gate of the anti-blooming transistor 1616 may receive an anti-blooming signal AB 1617.

Additionally or alternatively, the reset transistor 1605 may be a reset circuit (similar to that of transfer circuit 1602) in which a dual gate reset selection transistor may be connected in series between floating diffusion node 1604 and the potential VDDrst 1607, in which one of the reset selection transistor gates is controlled by RSTx 1613 and the other controlled by RSTy 1614.

FIG. 17 shows an example timing diagram for a circuit, e.g., a CMOS sensor, with two transfer select signals and two reset select signals according to FIG. 16B. FIG. 17 includes a reset select signal RSTx, a reset select signal RSTy, a transfer select signal TXx, and transfer select signal TXy. FIG. 17 shows the operation of a reset transistor in response to a reset signal, which is a combination of the reset select signal RSTx and the reset select signal RSTy. When both the reset select signals RSTx and RSTy are in the high-voltage state, the reset transistor is on. However, when one or both of the reset select signals RSTx and RSTy are in the low-voltage state, the reset transistor is off.

FIG. 17 further shows the operation of the transfer transistor in response to the combination of transfer select signals TXx and TXy. When both the transfer select signals TXx and TXy are in the high-voltage state, the transfer transistor is on. However, when one or both of the transfer select signals TXx and TXy are in the low-voltage state, the transfer transistor is off.

FIG. 18A shows an example logic table for the operation of the reset transistor using two reset select signals as shown in FIG. 16B. Two values {0,1} for the RSTx reset select signal are shown as row identifiers in the table of FIG. 18A and two values {0,1} for the RSTy reset select signal are shown as column identifiers in the table of FIG. 18A. When the RSTx signal is {0}, the reset transistor is floating. When the RSTx signal is {1} and the RSTy signal is {0}, the reset transistor is off (represented by a {0}). When both of the reset select signals is {1}, the reset transistor is on (represented by a {1}).

FIG. 18B shows an example logic table for the operation of the transfer transistor using two transfer select signals as shown in FIG. 16B. Two values {0,1} for the transfer select signal TXx are shown as row identifiers in the table of FIG. 18B and two values {0,1} for the transfer select signal TXy are shown as column identifiers in the table of FIG. 18B. When the TXx signal is {0}, the transfer transistor is off (represented by a {0}). When the TXx signal is {1} and the TXy signal is {0}, the reset transistor is off. When both of the transfer select signals are {1}, the transfer transistor is on (represented by a {1}).

Figure 19:
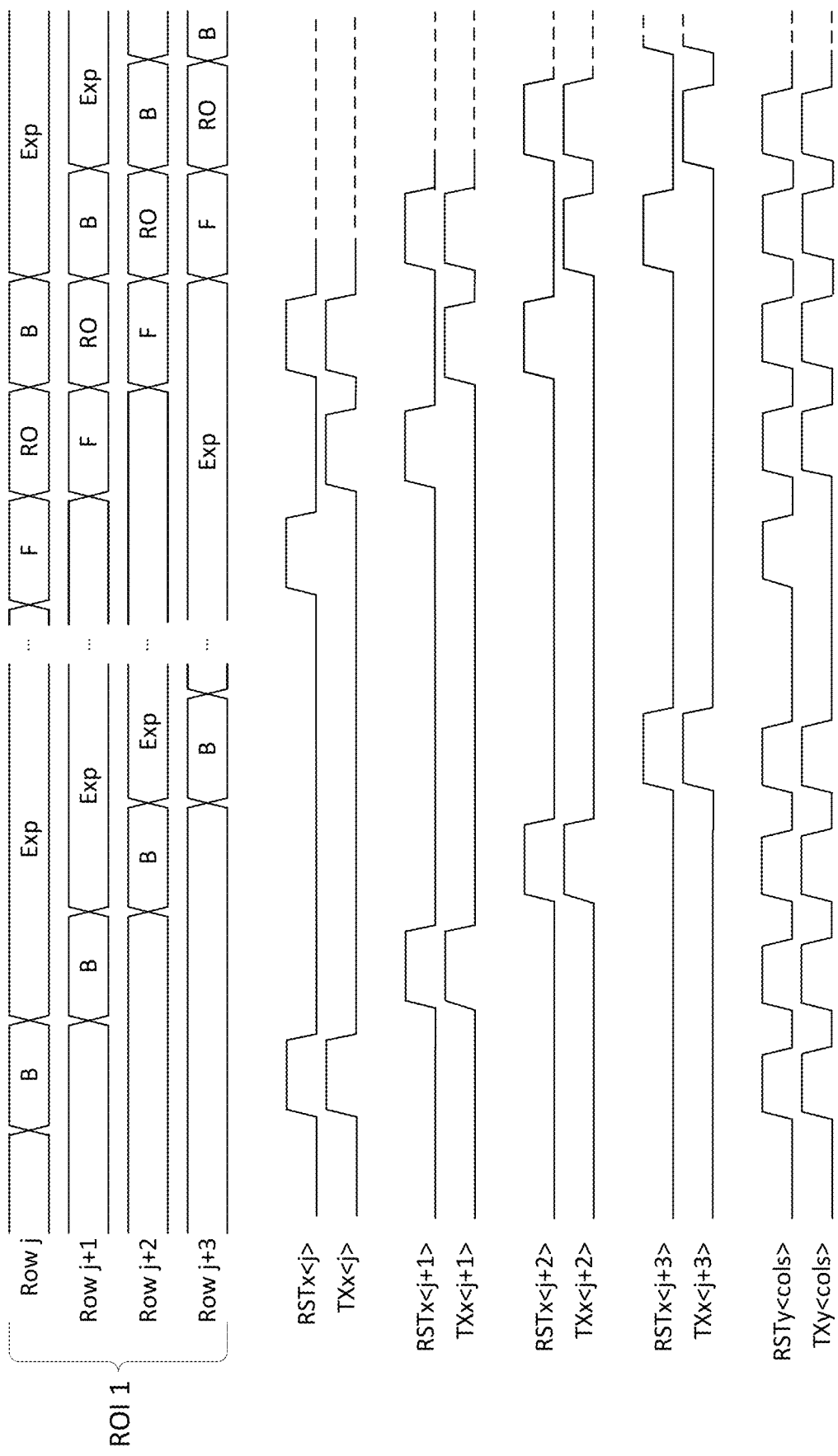
FIG. 19 shows an illustrative timing diagram for reset and transfer transistors with multiple reset and transfer select signals.

FIG. 19 shows an exemplary timing diagram for reset and transfer transistors with multiple reset and transfer select signals. FIG. 19 shows an ROI with four pixels in four rows and in a common column. ROI 1 includes pixels in each of row J, row J+1, row J+2, and row J+3. The pixels are exposed using a rolling shutter. FIG. 19 timing diagram is for the reset select signals and the transfer select signals for each of the four pixels. The first pixel (in row J) enters the B reset state when the RSTx<J>, TXx<J>, RSTy<cols> and TXy<cols> signals are high. The second pixel (in row J+1) enters the B reset state when the RSTx<J+1>, TXx<J+1>, RSTy<cols> and TXy<cols> signals are high. The third pixel (in row J+2) enters the B reset state when the RSTx<J+2>, TXx<J+2>, RSTy<cols> and TXy<cols> signals are high. The fourth pixel (in row J+3) enters the B reset state when the RSTx<J+3>, TXx<J+3>, RSTy<cols> and TXy<cols> signals are high. The B reset states of the different rows of pixels start at different times.

To enter the Exp (exposure) state, the row-related select signals are lowered to a low voltage level. The first pixel (in row J) enters the Exp state when the RSTx<J> and TXx<J> signals are low. The second pixel (in row J+1) enters the Exp state when the RSTx<J+1> and TXx<J+1> signals are low. The third pixel (in row J+2) enters the Exp state when the RSTx<J+2> and TXx<J+2> signals are low. The fourth pixel (in row J+3) enters the Exp state when the RSTx<J+3> and TXx<J+3> signals are low. The pixels enter the Exp exposure state irrespective of the RSTy<cols> and TXy<cols> signal levels. Accordingly, the RSTy<cols> and TXy<cols> signals are used to reset the remaining pixels before the RSTy<cols> and TXy<cols> are set to the low voltage level. The Exp states of the different rows of pixels start at different times.

To enter the F reset state, the reset select signals are raised to the high level while the row-related transfer select signals remain low. The first pixel (in row J) enters the F reset state when the RSTx<J> signal is high and the RSTy<cols> signal is high. The second pixel (in row J+1) enters the F reset state when the RSTx<J+1> signal is high and the RSTy<cols> is high. The third pixel (in row J+2) enters the F reset state when the RSTx<J+2> signal is high and the RSTy<cols> is high. The fourth pixel (in row J+3) enters the F reset state when the RSTx<J+3> signal is high and the RSTy<cols> is high. The F reset states of the different rows of pixels start at different times.

To enter the RO (readout) state, the row-related reset select signal is dropped to the low level and the row-related transfer select signal is raised to the high level. The first pixel (in row J) enters the RO state when the RSTx<J> signal is low, the TXx<J> signal is high, and the TXy<cols> signal is high. The second pixel (in row J+1) enters the RO state when the RSTx<J+1> signal is low, the TXx<J+1> signal is high, and the TXy<cols> signal is high. The third pixel (in row J+2) enters the RO state when the RSTx<J+2> signal is low, the TXx<J+2> signal is high, and the TXy<cols> signal is high. The fourth pixel (in row J+3) enters the RO state when RSTx<J+3> signal is low, the TXx<J+3> signal is high, and the TXy<cols> signal is high. The RO states of the different rows of pixels start at different times.

Figure 20:
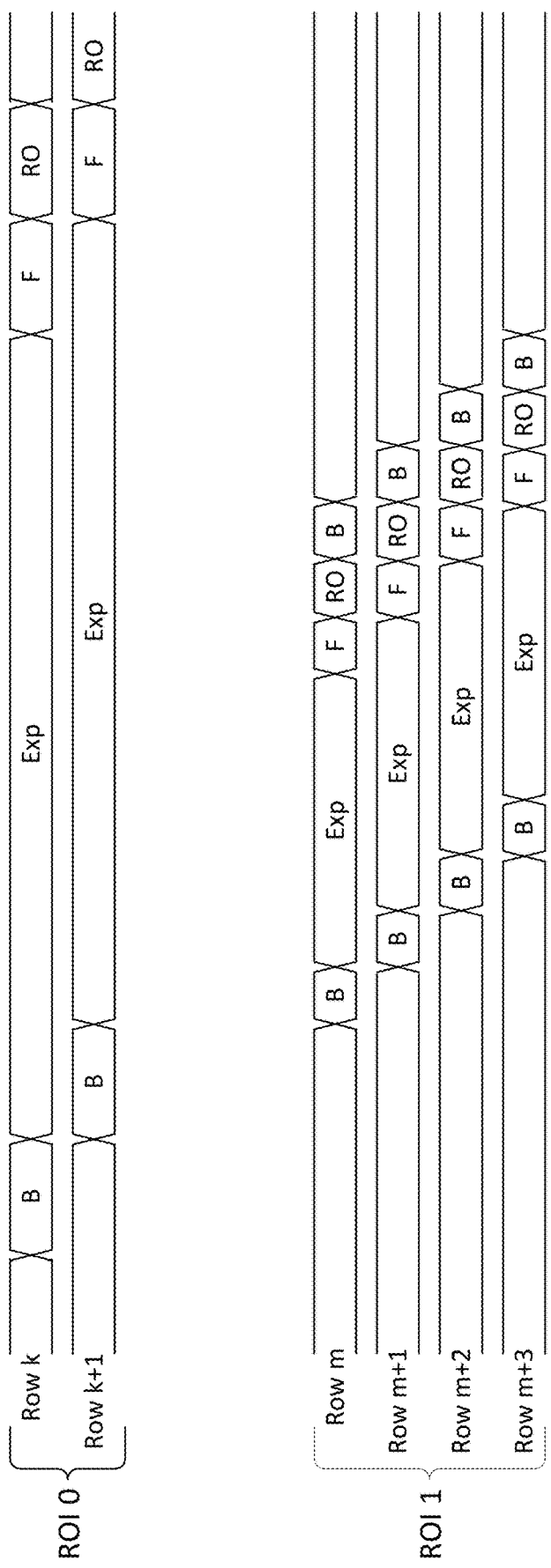
FIG. 20 shows an example timing diagram for two ROIs with different exposure times.

FIG. 20 shows an exemplary timing diagram for two ROIs with different exposure lengths. A first ROI 0 includes pixels in two rows: row k and row k+1. A second ROI 1 includes pixels in four rows: row m, row m+1, row m+2, and row m+3. The exposure times for the pixels in ROI 0 are longer than the exposure times for the pixels in ROI 1. The other states (including reset B, reset F, and readout RO) are also shorter in ROI 1 compared to the corresponding states in ROI 0. Additionally or alternatively, the other states (reset B, reset F, and readout RO) may be the same length or longer in ROI 1 compared to the corresponding states in ROI 0. The Exp states of the individual pixels in ROI 0 and ROI 1 may start at different times or two or more may start at the same time. The lengths of the exposure times between ROI 0 and ROI 1 may be the same or different.

Figure 21:
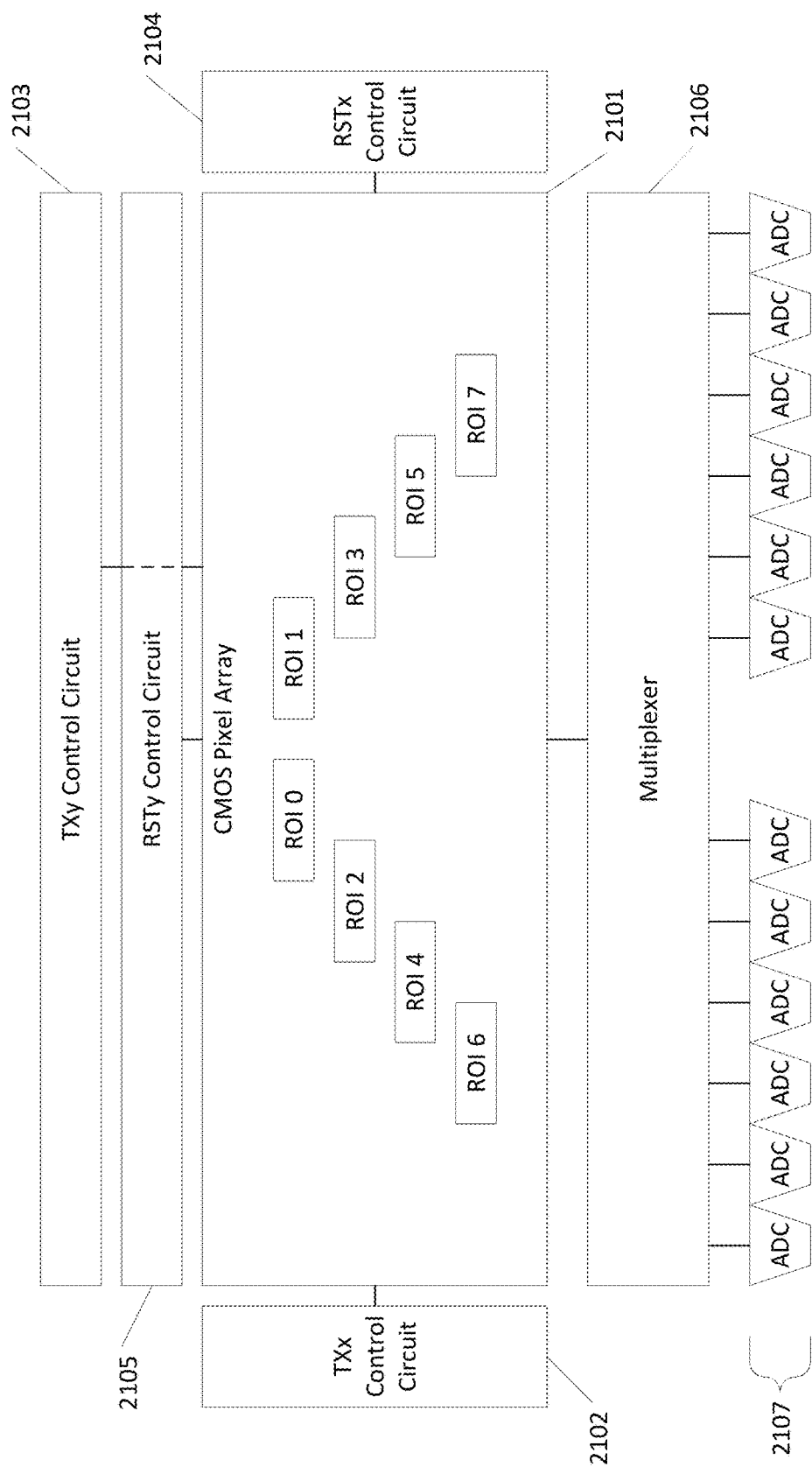
FIG. 21 shows a block diagram of control circuitry and a CMOS pixel array having multiple ROIs.

FIG. 21 shows an example of one block diagram of control circuitry and a CMOS array having multiple ROIs. The FIG. 21 CMOS pixel array 2101 includes eight ROIs (shown as ROI 0 through ROI 7) with some ROIs (e.g., ROI 0, ROI 2, ROI 4, and ROI 6) appearing on a left side of the CMOS pixel array 2101 and other ROIs (e.g., ROI 1, ROI 3, ROI 5, and ROI 7) appearing on the right side of the CMOS pixel array 2101. The ROIs may be arranged to comport with areas of the CMOS pixel array to be monitored, and as such, as shown in FIG. 21, some ROIs may share a same row and/or column with other ROIs. FIG. 21 includes control circuitry that may include control circuitry for TXx 2102, control circuitry for TXy 2103, control circuitry for RSTx 2104, and control circuitry for RSTy 2105. Through operation of the control circuits, the ROIs 0-8 may be reset, exposed, reset, and read out at various timings including where two or more of the ROIs have different exposure times. Though represented in FIG. 21 as separate functional blocks, one or more of the control circuits 2102, 2103, 2104, and/or 2105 may be combined into a combination control circuit or circuits as desired.

FIG. 21 also includes a multiplexer 2106 and a quantity of analog-to-digital converters (ADCs) 2107. The multiplexer 2106 permits routing of one pixel of a column in an ROI to be routed to a specific ADC and read. For example, the multiplexer 2106 may direct all columns of ROI 0 to be read by a first set of ADCs while directing less than all columns of ROI 1 to be read by a second set of ADCs while the remaining columns are read by a third set of ADCs. The ability of multiplexer 2106 to selectively assign one or more columns of an ROI permits improved interleaving of the control of the states of pixels in each ROI. The ADCs alone or in combination with other circuitry including one or more multiplexers may be understood as one example of a reading circuit.

Figure 22:
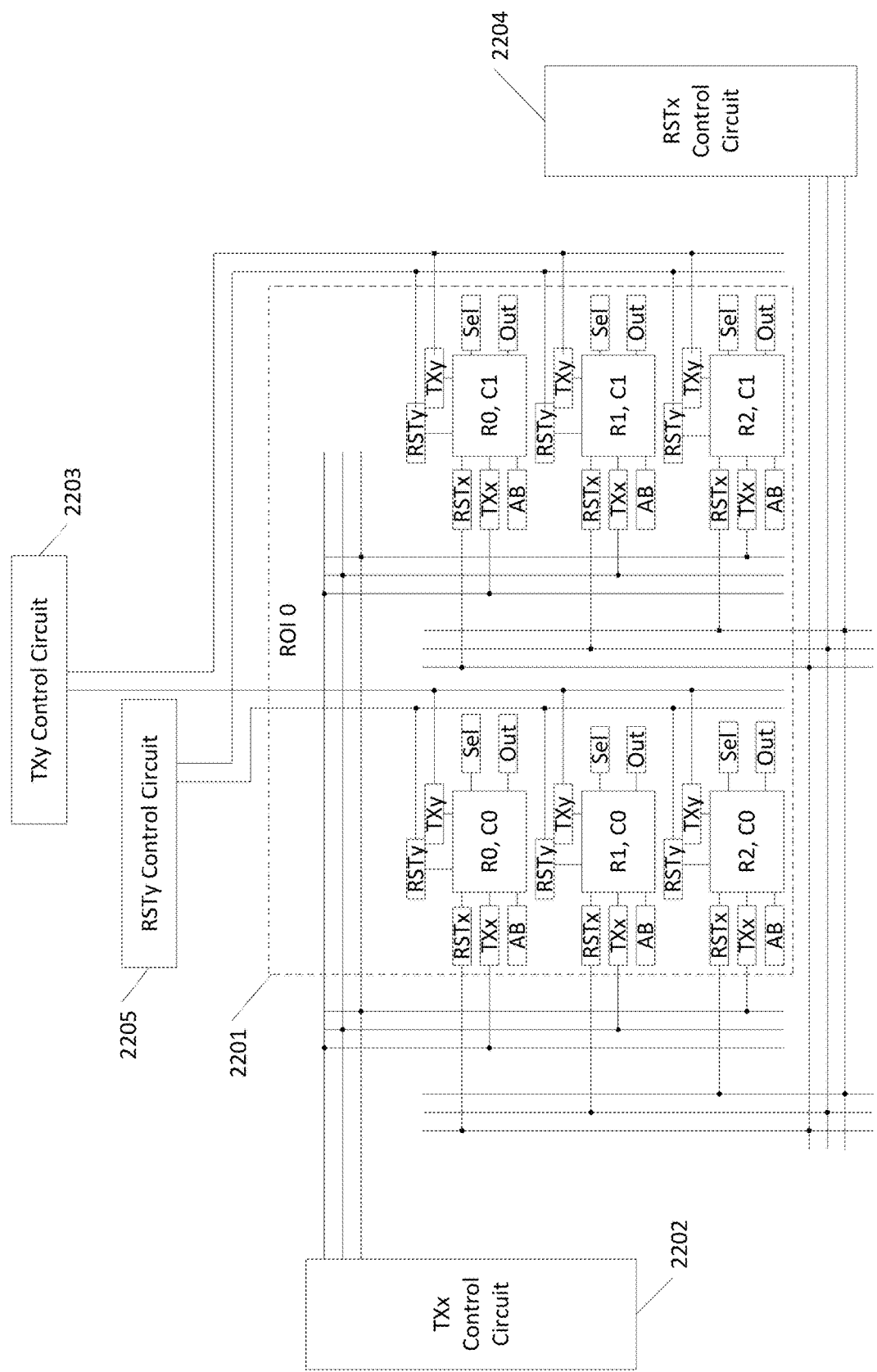
FIG. 22 shows a circuit diagram with six pixels in an ROI.

FIG. 22 shows an example circuit diagram with six pixels in an ROI for an embodiment according to FIG. 21, although the present disclosure is not limited to such implementations. ROI 0 2201 is part of a larger CMOS pixel array where pixels outside of ROI 0 2201 are not shown. ROI 0 2201 includes six pixels in two columns (column 0 and column 1) by three rows (row 0, row 1, and row 2). Each pixel in FIG. 22 includes two transfer select inputs (TXx and TXy), two reset select inputs (RSTx and RSTy), an anti-blooming input (AB), a pixel select input (Sel), and an output terminal (Out). FIG. 22 includes a first transfer control circuit 2202 with multiple transfer select lines corresponding to the number of rows in the pixel array. FIG. 22 also includes a second transfer control circuit 2203 with multiple transfer select lines corresponding to the number of columns in the pixel array. For simplicity, the first transfer control circuit 2202 and the second transfer control circuit 2203 are shown with three select lines and two select lines, respectively, corresponding to the number of rows and the number of columns related to ROI 0 2201. FIG. 22 also includes a first reset select control circuit RSTx 2204 and a second reset select control circuit RSTy 2205.

FIG. 22 shows the various control lines connected to sub-control lines to permit the pixels to receive the relevant select signals. The arrangements of the control lines in FIG. 22 are merely examples and other arrangements may be readily used. For simplicity, connections to the anti-blooming inputs, the selection inputs, and the output terminals of each pixel are not shown.

Figure 23:
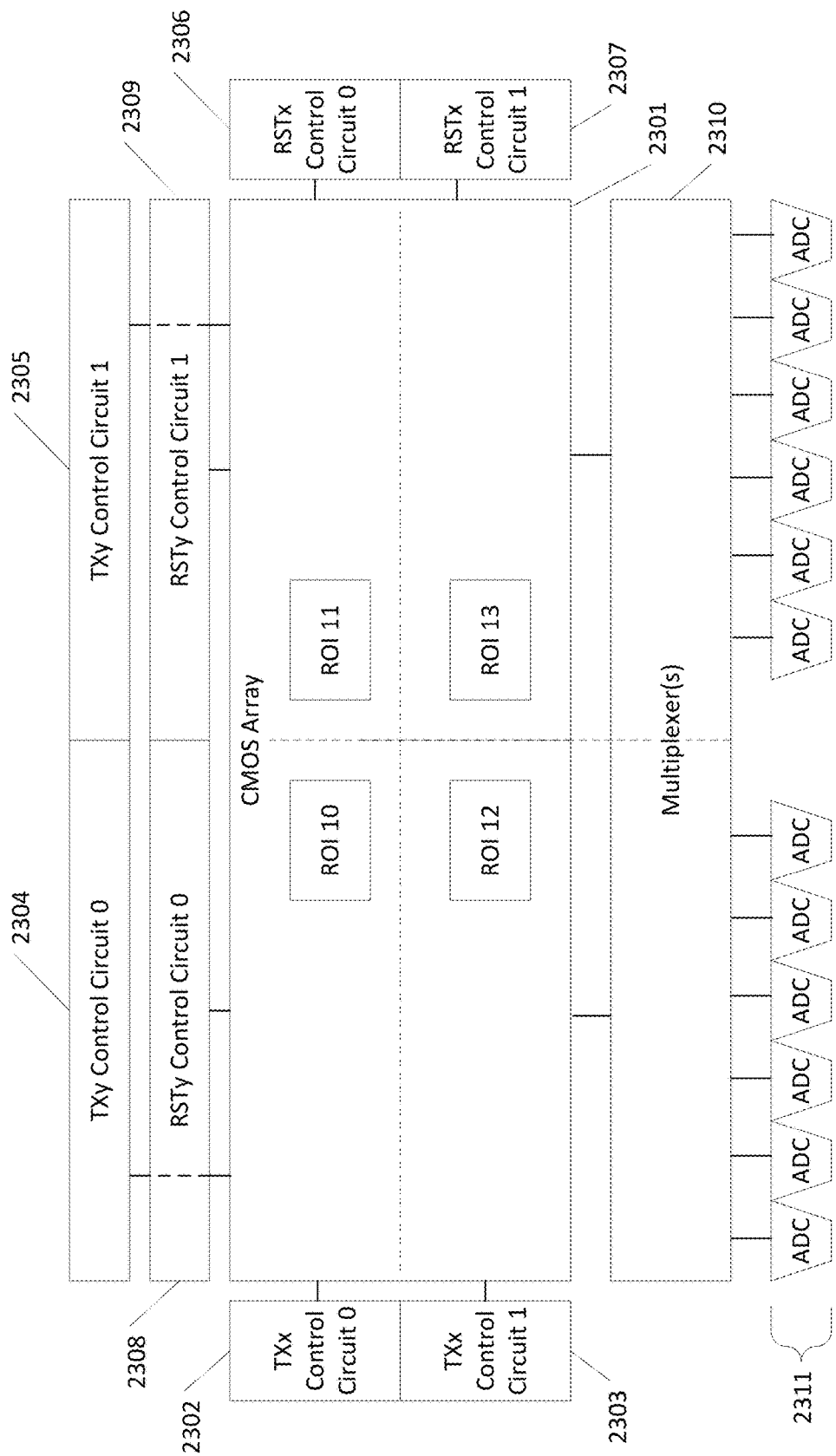
FIG. 23 shows a block diagram of control circuitry and a CMOS array with ROIs managed by different control circuitry.

FIG. 23 shows a block diagram of example control circuitry and a CMOS array with ROIs managed by different control circuitry. A CMOS array 2301 includes four ROIs (e.g., ROI 10, ROI 11, ROI 12, and ROI 13). In contrast to the CMOS array of FIG. 21, the ROIs are handled by different combinations of control circuitry. A first transfer select control circuit TXx 0 2302 supports a first set of rows while a second transfer select control circuit TXx 1 2303 supports a second set of rows. A first transfer selection control circuit TXy 0 2304 supports a first set of columns while a second transfer select control circuit TXy 1 2305 supports a second set of columns. A first reset select control circuit RSTx 0 2306 supports a first set of rows while a second reset select control circuit RSTx 1 2307 supports a second set of rows. A first reset selection control circuit RSTy 0 2308 supports a first set of columns while a second reset select control circuit RSTy 1 2309 supports a second set of columns. A multiplexer 2310 may enable all of the pixels in CMOS array 2301 to be read by any of ADCs 2311 or may restrict columns of the CMOS array 2301 to be read by only a set of ADCs 2311.

For example, ROI 10 receives select inputs from transfer select control circuit TXx 0 2302, transfer select control circuit TXy 0 2304, reset select control circuit RSTx 0 2306, and reset select control circuit RSTy 0 2308. ROI 11 receives select inputs from transfer select control circuit TXx 0 2302, transfer select control circuit TXy 1 2305, reset select control circuit RSTx 0 2306, and reset select control circuit RSTy 1 2309. ROI 12 receives select inputs from transfer select control circuit TXx 1 2303, transfer select control circuit TXy 0 2304, reset select control circuit RSTx 1 2307, and reset select control circuit RSTy 0 2308. ROI 13 receives select inputs from transfer select control circuit TXx 1 2303, transfer select control circuit TXy 1 2305, reset select control circuit RSTx 1 2307, and reset select control circuit RSTy 1 2309.

The approach shown in FIG. 23 may be further expanded as $2^N$ where N is the total number of separate blocks in the CMOS array.

Figure 24:
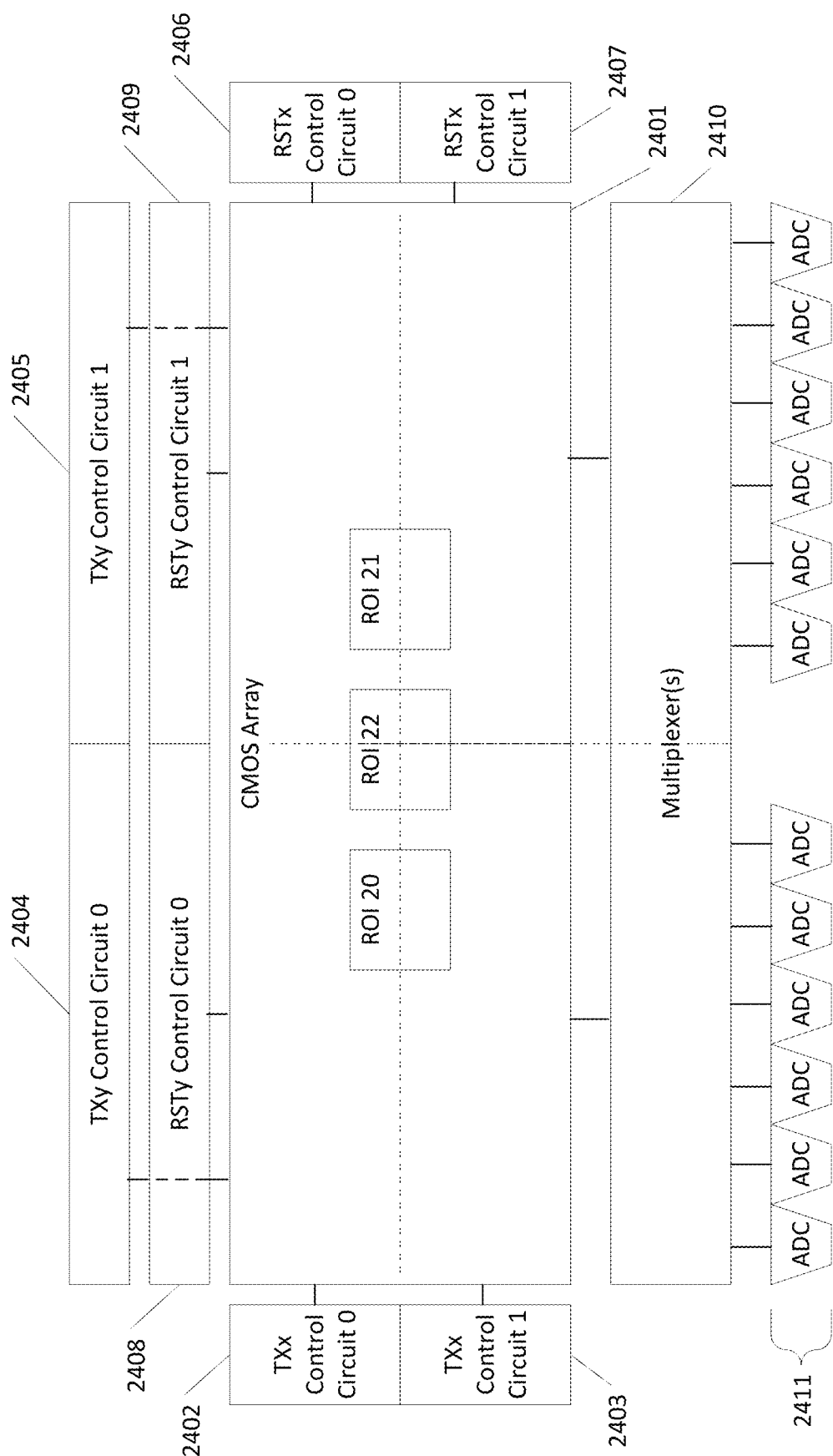
FIG. 24 shows a block diagram of control circuitry and a CMOS array with responsibility for ROIs shared among different control circuitry.

FIG. 24 shows a block diagram of one embodiment of control circuitry and a CMOS array with responsibility for each ROI being shared among different control circuitry. A CMOS array 2401 includes three ROIs (e.g., ROI 20, ROI 21, and ROI 22). Each ROI is handled by different combinations of control circuitry. A first transfer select control circuit TXx 0 2402 supports a first set of rows while a second transfer select control circuit TXx 1 2403 supports a second set of rows. A first transfer selection control circuit TXy 0 2404 supports a first set of columns while a second transfer select control circuit TXy 1 2405 supports a second set of columns. A first reset select control circuit RSTx 0 2406 supports a first set of rows while a second reset select control circuit RSTx 1 2407 supports a second set of rows. A first reset selection control circuit RSTy 0 2408 supports a first set of columns while a second reset select control circuit RSTy 1 2409 supports a second set of columns. A multiplexer 2410 may enable all of the pixels in CMOS array 2401 to be read by any of ADCs 2411 or may restrict columns of the CMOS array 2401 to be read by only a set of ADCs 2411.

For example, a first portion of ROI 20 receives select inputs from transfer select control circuit TXx 0 2402, transfer select control circuit TXy 0 2404, reset select control circuit RSTx 0 2406, and reset select control circuit RSTy 0 2408. A second portion of ROI 20 receives select inputs from transfer select control circuit TXx 1 2403, transfer select control circuit TXy 0 2404, reset select control circuit RSTx 1 2407, and reset select control circuit RSTy 0 2408.

A first portion of ROI 21 receives select inputs from transfer select control circuit TXx 0 2402, transfer select control circuit TXy 1 2405, reset select control circuit RSTx 0 2406, and reset select control circuit RSTy 1 2409. A second portion of ROI 21 receives select inputs from transfer select control circuit TXx 1 2403, transfer select control circuit TXy 1 2405, reset select control circuit RSTx 1 2407, and reset select control circuit RSTy 1 2409.

ROI 22 receives four different combinations of select signals. A first portion receives select inputs from transfer select control circuit TXx 0 2402, transfer select control circuit TXy 0 2404, reset select control circuit RSTx 0 2406, and reset select control circuit RSTy 0 2408. A second portion of ROI 22 receives select inputs from transfer select control circuit TXx 1 2403, transfer select control circuit TXy 0 2404, reset select control circuit RSTx 1 2407, and reset select control circuit RSTy 0 2408. A third portion of ROI 22 select inputs from transfer select control circuit TXx 0 2402, transfer select control circuit TXy 1 2405, reset select control circuit RSTx 0 2406, and reset select control circuit RSTy 1 2409. A fourth portion of ROI 22 receives select inputs from transfer select control circuit TXx 1 2403, transfer select control circuit TXy 1 2405, reset select control circuit RSTx 1 2407, and reset select control circuit RSTy 1 2409.

While possibly increasing noise, the approach of FIG. 24 may permit a ROI to be handled twice as fast as an ROI supported solely by one set of circuitry.

Figure 25:
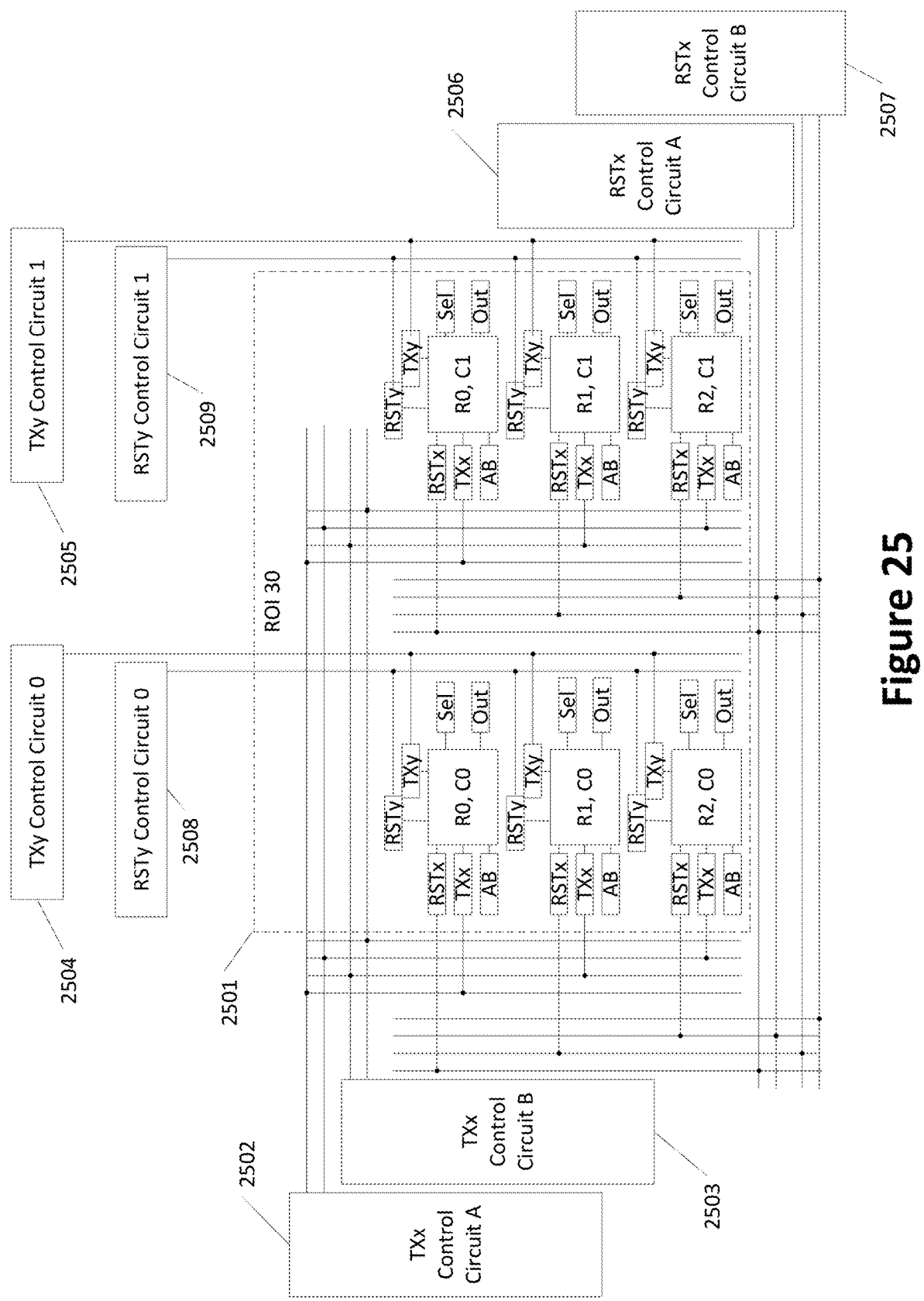
FIG. 25 shows a circuit diagram with six pixels in an ROI controlled by different sets of control circuitry.

FIG. 25 shows an example circuit diagram with six pixels in an ROI controlled by different sets of control circuitry. FIG. 25 shows a circuit diagram with six pixels in an ROI. ROI 0 2501 is part of a larger CMOS pixel array where pixels outside of ROI 0 2501 are not shown. ROI 0 2501 includes six pixels in two columns (column 0 and column 1) by three rows (row 0, row 1, and row 2). Each pixel in FIG. 25 includes two transfer select inputs (TXx and TXy), two reset select inputs (RSTx and RSTy), and anti-blooming input (AB), a pixel select input (Sel), and an output terminal (Out). FIG. 25 includes a first transfer select control circuit TXx A 2502 with multiple transfer select lines corresponding to a first portion of rows in the pixel array. FIG. 25 also includes a second transfer select control circuit TXx B 2503 with multiple transfer select lines corresponding to a second portion of rows in the pixel array. FIG. 25 includes a third transfer select control circuit TXy 0 2504 with multiple transfer select lines corresponding to a first portion of columns in the pixel array. FIG. 25 also includes a fourth transfer select control circuit TXy 1 2505 with multiple transfer select lines corresponding to a second portion of columns in the pixel array.

FIG. 25 includes a first reset select control circuit RSTx A 2506 with multiple reset select lines corresponding to a first portion of rows in the pixel array. FIG. 25 also includes a second reset select control circuit RSTx B 2507 with multiple reset select lines corresponding to a second portion of rows in the pixel array. FIG. 25 includes a third reset select control circuit RSTy 0 2508 with multiple reset select lines corresponding to a first portion of columns in the pixel array. FIG. 25 also includes a fourth reset select control circuit RSTy 1 2509 with multiple reset select lines corresponding to a second portion of columns in the pixel array.

The rows and columns may be controlled by corresponding select circuitry or may vary based on the architecture. For example, the number of row transfer select circuits may be different or the same from the number of column select circuits.

FIG. 25 shows the various control lines connected to sub-control lines to permit the pixels to receive the relevant select signals. The arrangements of the control lines in FIG. 25 are merely examples and other arrangements may be readily used. For simplicity, connections to the anti-blooming inputs, the selection inputs, and the output terminals of each pixel are not shown.

Figure 26:
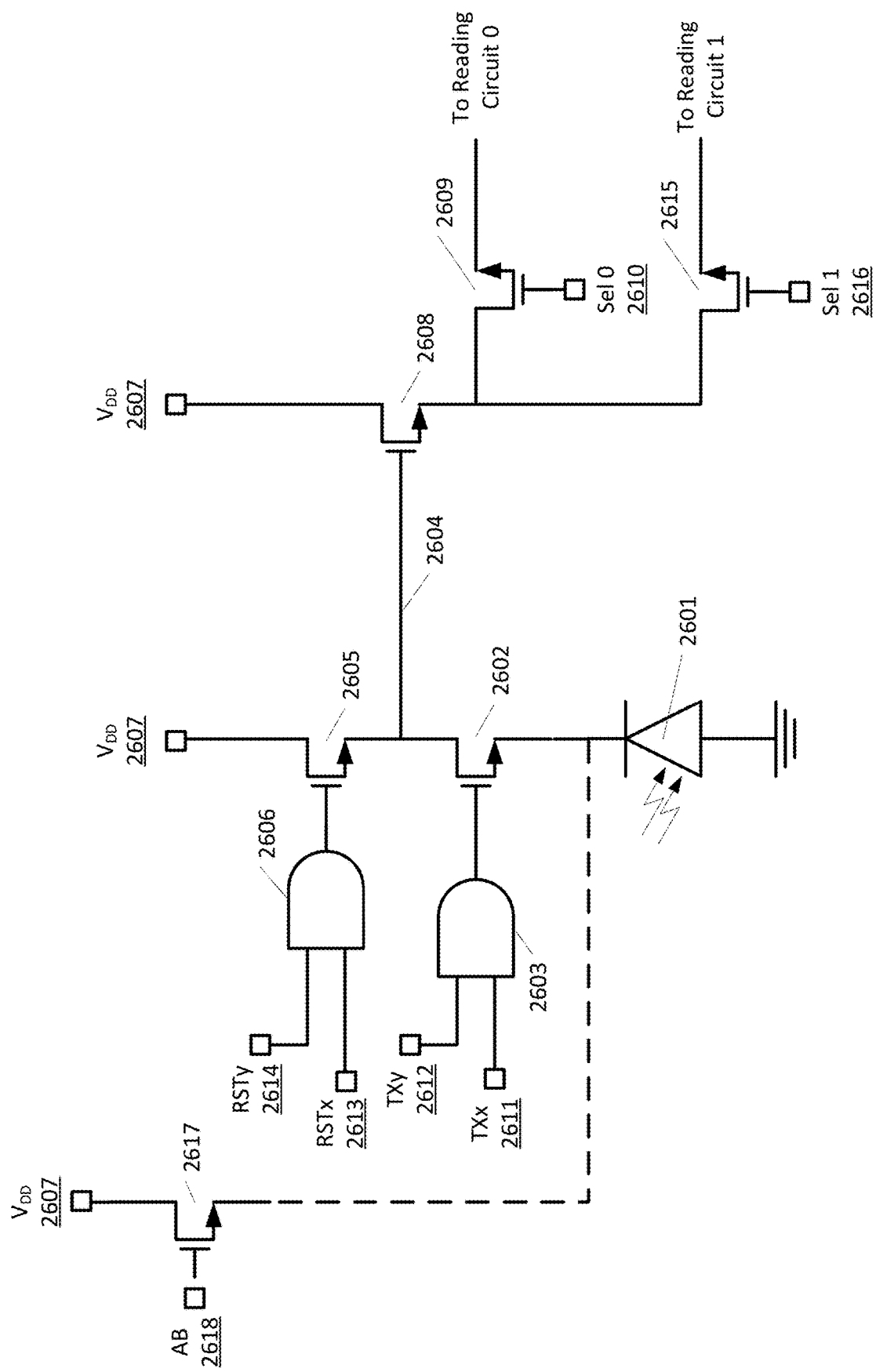
FIG. 26 shows a pixel with multiple transfer select signals, multiple reset select signals, and multiple output selection transistors.

FIG. 26 shows an example pixel with multiple transfer select signals, multiple reset select signals and multiple output selection transistors. FIG. 26 includes a photodiode 2601 connected between a potential (e.g., ground) and a transfer transistor 2602. The transfer transistor 2602 may be controlled by a transfer signal (represented functionally in FIG. 26 as an AND logic gate 2603, but those of ordinary skill will understand that such functionality can be achieved in multiple manners) connected to the gate of the transfer transistor 2602. The transfer transistor 2602 connects the photodiode 2601 to a floating diffusion node 2604. A reset transistor 2605 may connect the floating diffusion node 2604 with a constant potential, represented in FIG. 26 as VDD 2607. The reset transistor 2605 may be controlled by a reset signal (represented functionally in FIG. 26 as an AND logic gate 2606, but those of ordinary skill will understand that such functionality can be achieved in multiple manners) connected to the gate of the reset transistor 2605. The AND logic gate 2603 may receive as inputs two or more transfer select signals, represented by TXx 2611 and TXy 2612. The AND logic gate 2606 may receive as inputs two or more reset select signals, represented by RSTx 2613 and RSTy 2614. A gate of an output transistor 2608 may be connected to the floating diffusion node 2604 and a terminal (e.g., source/drain) of the output transistor 2608 may be connected to a terminal of a first selection transistor 2609 and to a terminal of a second selection transistor 2615. The other terminal of the output transistor 2608 may be connected to a constant potential (here, VDD 2607). The first selection transistor 2609 connects the terminal of the output transistor 2608 to one or more output lines leading to a reading circuit 0 (not shown) and the second selection transistor 2615 connects the terminal of the output transistor 2608 to one or more output lines leading to the same or different reading circuit 1 (not shown). The first selection transistor 2609 may be controlled by a select signal 2610 connected to the gate of the first selection transistor 2609. The second selection transistor 2615 may be controlled by a select signal 2616 connected to the gate of the second selection transistor 2615. The combination of two or more selection transistors per cell permits interleaving control of rows and/or columns of ROIs with the outputs sent to different sets of reading circuits (e.g., reading circuit 0 and reading circuit 1). FIG. 26 also includes an optional anti-blooming transistor 2617 connected between the photodiode 2601 and a potential shown as VDD. An anti-blooming select signal 2618, AB, is connected to the gate of the anti-blooming transistor 2617.

Figure 27:
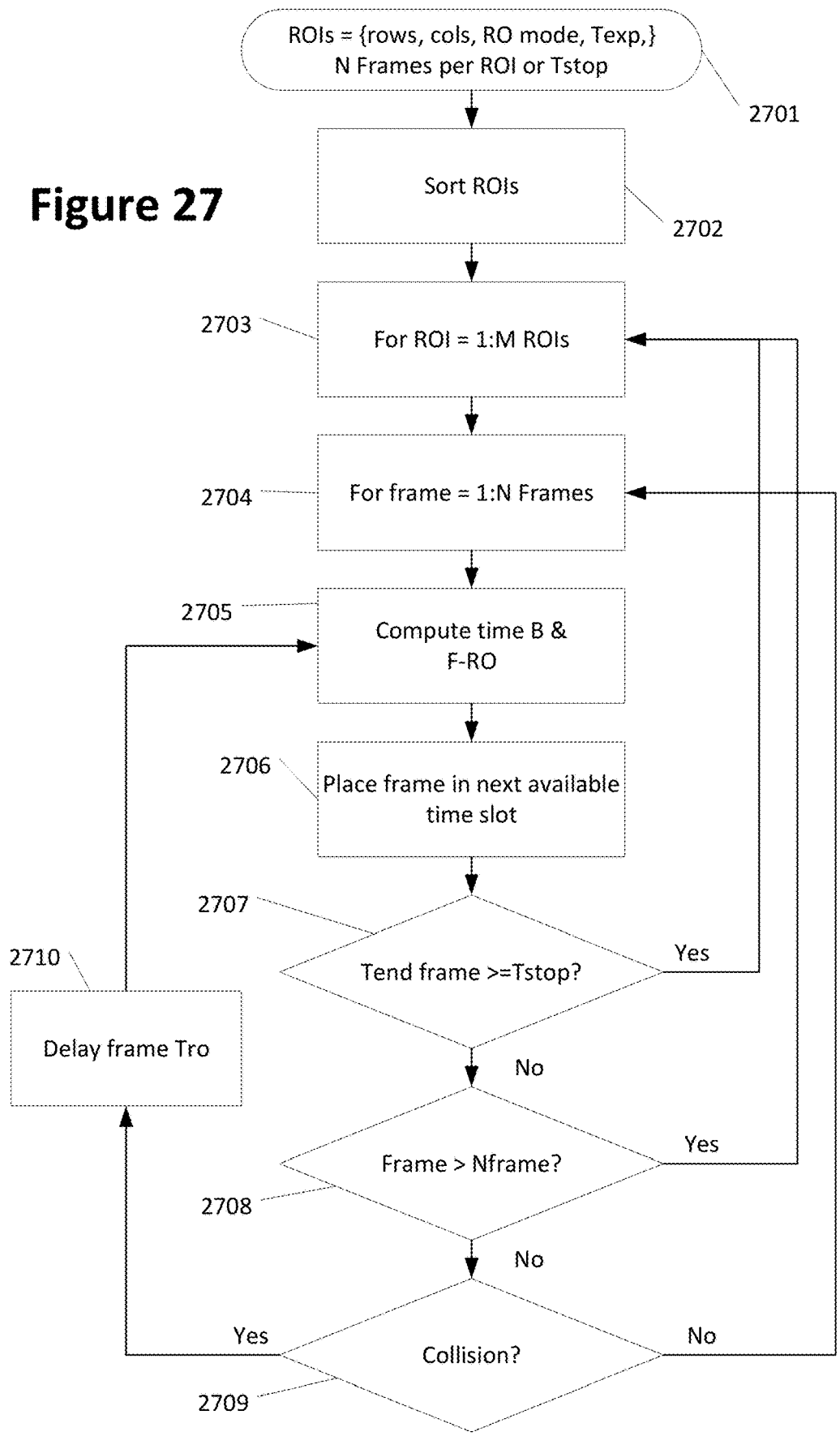
FIG. 27 shows a process for scheduling when ROIs are to be activated.

FIG. 27 shows an example of one possible depiction for scheduling when ROIs are to be reset, exposed, reset, and read out. Those of ordinary skill will understand that FIG. 27 is not a linear flow-diagram, but rather, as stated herein, a depiction of scheduling. The process thus relates to ROIs being defined by the number of rows, the number of columns, the read out mode, and an exposure time) 2701. Here, the number of ROIs is designated as M. Also, a number of frames N are budgeted per ROI. Additionally or alternatively, a stop time Tstop may also be included. At 2702, a process for sorting selects when the ROIs is activated. At 2703, a beginning of a loop is shown for ROIs ranging from 1 to M ROIs. At 2704, a beginning of a loop is shown for frames 1 to N. At 2705, a time for reset B, reset F, and readout RO is computed. At 2706, a frame for controlling the operation of a specific ROI is placed in the next available time slot. At 2707, the FIG. 27 scheduling determines whether the time to complete a frame for an ROI is available (e.g., has the desired total time been exceeded). If insufficient time is available, then the process returns to 2703 to handle the next ROI. If enough time is available to handle all states of a pixel of an ROI, then the process proceeds to 2708. At 2708, the process determines whether the desired number of frames has been collected for an ROI. If enough frames have been collected for an ROI, the process returns to 2703 to handle the next ROI. If another frame needs to be added, then the process determines whether a collision exists between the transfer select signals, the reset select signals, and the outputs onto columns for the newly added frame. If there is no collision, then the process returns to 2704. If there is a collision, then the frame is delayed by a time Tro as shown at 2710 and returns to 2705. Time Tro may be defined as the time to read out information from a photodiode through the reading circuitry. Because the readout operations may be stacked for n rows or columns, the time Tro may include the readouts from n rows or columns. Calculating the total time of reading out all rows or columns from all ROIs may be the total time of the rows or columns read out separately and 1/n of the rows or columns read out together. Accordingly, in some instances Tro may be equal to Trow/n where Trow is the readout time of a row.

Figure 28:
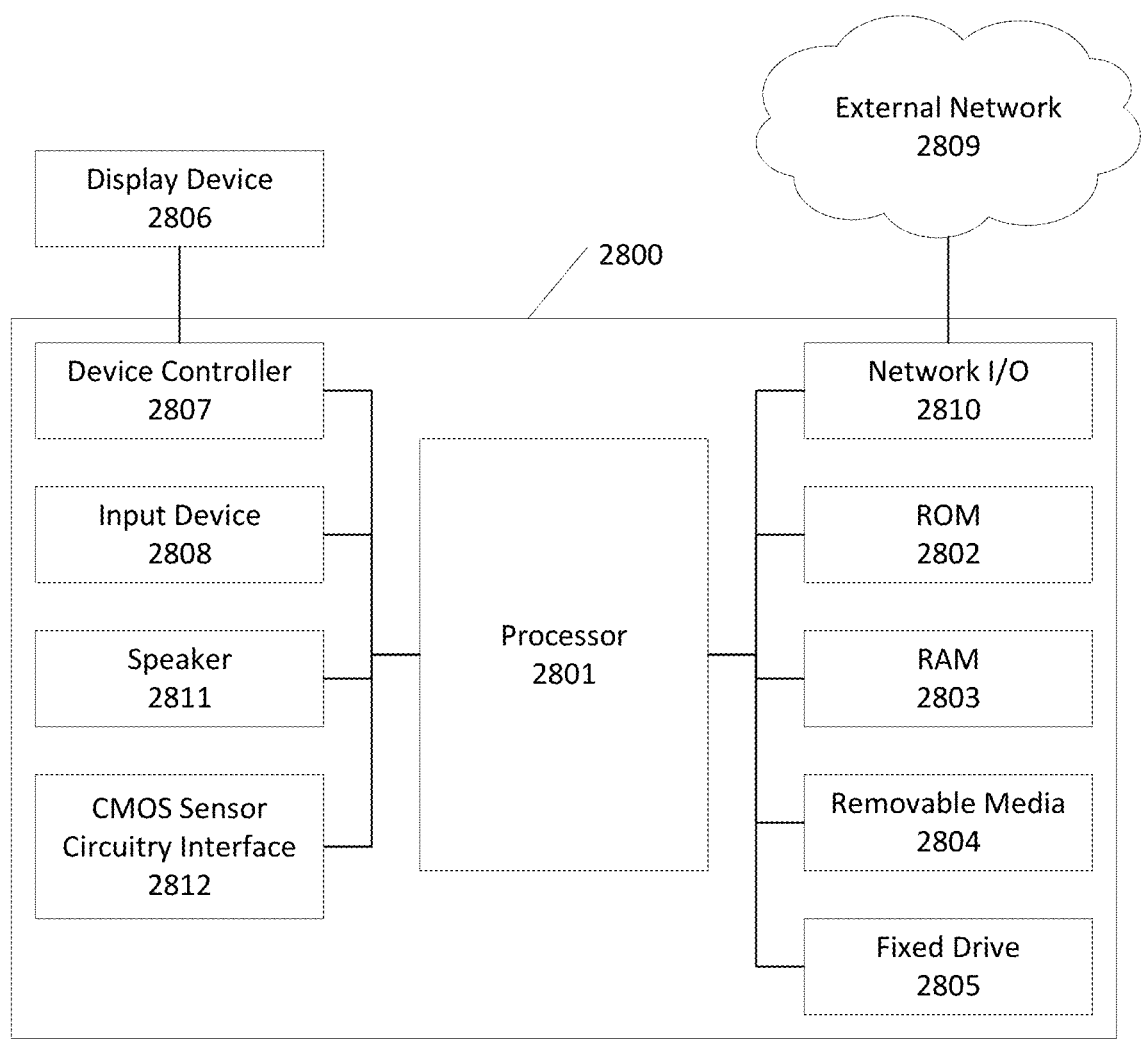
FIG. 28 shows a block diagram of a hardware computing device.

FIG. 28 shows hardware elements of a computing device 2800 that may be used to determine the order of the handling of ROIs and additionally, or alternatively, control the related circuitry of the CMOS sensor. The computing device 2800 may comprise one or more processors 2801, which may execute instructions of a computer program to perform any of the functions described herein. The instructions may be stored in a read-only memory (ROM) 2802, a random access memory (RAM) 2803, a removable media 2804 (e.g., a USB drive, a compact disk (CD), a digital versatile disk (DVD)), and/or in any other type of computer-readable medium or memory. Instructions may also be stored in an attached (or internal) fixed drive 2805 or other types of storage media.

The computing device 2800 may comprise one or more output devices, such as a display device 2806 (e.g., an external display screen and/or other external or internal display device) and a speaker 2811, and may comprise one or more output device controllers 2807, such as a video processor. One or more user input devices 2808 may comprise a remote control, a keyboard, a mouse, a touch screen (which may be integrated with the display device 2806), microphone, etc. The computing device 2800 may also comprise one or more network interfaces, such as a network input/output (I/O) interface 2810 (e.g., a network card) to communicate with an external network 2809. The network I/O interface 2810 may be a wired interface (e.g., electrical, RF (via coax), optical (via fiber)), a wireless interface, or a combination of the two. The network I/O interface 2810 may comprise a modem configured to communicate via the external network 2809.

The computing device may include an interface 2812 to control and/or program the transfer select, reset select, and other circuitry associated with the CMOS sensor. The processor 2801 may comprise a single processor or multiple processors where each of the multiple processors may perform fewer operations. For example, one processor may be resident in a housing containing CMOS sensor. Another processor may be resident in an external device that interacts with the CMOS sensor.

Although FIG. 28 shows an example hardware configuration, one or more of the elements of the computing device 2800 may be implemented as software or a combination of hardware and software. Modifications may be made to add, remove, combine, divide, etc. components of the computing device 2800. Additionally, the elements shown in FIG. 28 may be implemented using basic computing devices and components that have been configured to perform operations such as are described herein. For example, a memory of the computing device 2800 may store computer-executable instructions that, when executed by the processor 2801 and/or one or more other processors of the computing device 2800, cause the computing device 2800 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

In the example of a spectrometer system in which the CMOS sensor may be used, the light at a given wavelength may be concentrated at a specific portion of a light sensor. By limiting the ROIs to the specific locations where the light will be concentrated, the CMOS sensor may be operated more efficiently than scanning the entire array. In a spectrometer, the light being measured by a light sensor may cover multiple orders of magnitude. Exposing all ROIs for a given length of time limits the detectable light as some ROIs will be properly exposed while others may be either underexposed or overexposed. For example, in inductively coupled plasma optical emission spectroscopy (ICP-OES), a sample may be injected into a plasma and the resulting excitation of the sample in the plasma generates charged ions. As various molecules in the sample break up into their respective atoms, which then lose electrons and recombine repeatedly in the plasma, they emit radiation at a characteristic wavelength of the elements involved. A spectrometer may receive light from a light source (e.g., ICP-OES plasma or other light source including but not limited to a telescope, microscope, or other light-generating or light-conveying system).

Various techniques may be applied to the CMOS sensor array to accommodate for the orders of magnitude of light. A sample may be injected into the plasma and its light received on the CMOS sensor. The pixels in one or more ROIs may be analyzed to determine whether the pixels were overexposed, underexposed, or properly exposed. The exposure lengths of the ROIs may be adjusted and the operation of the CMOS sensor adjusted to accommodate the modified exposure lengths and any additional reset B, reset F, and/or read out RO times. The sample may then be passed again through the plasma and, if needed, the exposure times adjusted for pixels in desired ROIs to be properly exposed (e.g., lengthening the exposure time of underexposed pixels and/or shortening the exposure time for overexposed pixels).

For analyzing the light measured by the CMOS sensor, the intensity for each ROI or for each individual pixel may be used to determine the actual concentration of sample illuminating that ROI of the CMOS sensor.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A circuit comprising:

a first transfer transistor connecting a photodiode to a floating diffusion node, wherein the first transfer transistor is individually selectable by a combination of:

(i) a first transfer select input; and (ii) a second transfer select input;

a reset transistor connected between one or more potentials and the floating diffusion node, wherein the reset transistor is individually selectable by a combination of:

(i) a first reset select input; and (ii) a second reset select input;

a first reset selection transistor having a gate terminal connected to (i) the first reset select input or (ii) the second reset select input, and the first reset selection transistor also being connected between (1) a gate terminal of the reset transistor and (2) the other of (a) the first reset select input or (b) the second reset select input;

an output transistor in a source-follower configuration with a gate connected to the floating diffusion node; and a selection transistor connected to the output of the output transistor.

2. The circuit according to claim 1, further comprising:
a first transfer selection transistor having a gate terminal connected to:
  (i) the first transfer select input, or
  (ii) the second transfer select input;
the first transfer selection transistor being connected between (1) a gate terminal of the first transfer transistor, and (2) the other of:
  (a) the first transfer select input, or
  (b) the second transfer select input.

3. The circuit according to claim 2, further comprising:
a second transfer selection transistor, wherein the second transfer selection transistor includes a gate terminal connected to a complementary transfer select input that is a complement of:
  (i) the first transfer select input, or
  (ii) the second transfer select input;
  the second transfer selection transistor also being connected between (1) the gate terminal of the first transfer transistor, and (2) one or more potentials.

4. The circuit according to claim 1, further comprising:
a second reset selection transistor, wherein the second reset selection transistor has a gate terminal connected to a complementary reset select input that is a complement of one of:
  (i) the first reset select input, or
  (ii) the second reset select input;
the second reset selection transistor also being connected between (1) the gate terminal of the reset transistor, and (2) one or more potentials.

5. The circuit according to claim 1, further comprising:
a transfer selection transistor having a gate terminal connected to one of (i) the first transfer select input, or (ii) the second transfer select input, the transfer selection transistor also being connected between (1) a gate terminal of the first transfer transistor, and (2) the other of (a) the first transfer select input or (b) the second transfer select input.

6. The circuit according to claim 1, further comprising:
at least one anti-blooming transistor.

7. A spectrometer system comprising:
a circuit according to claim 1.

8. The circuit according to claim 1, further comprising:
at least one transfer selection control circuit configured to:
  (i) individually address the first transfer select input, and
  (ii) individually address the second transfer select input.

9. The circuit according to claim 1, further comprising:
at least one reset selection control circuit configured to:
  (i) individually address the first reset select input, and
  (ii) individually address the second reset select input.

10. A CMOS sensor comprising:
at least one source-follower output;
at least one transfer selection control circuit configured to control (i) individually addressable first transfer select inputs, and (ii) individually addressable second transfer select inputs;
at least one reset selection control circuit configured to control (i) individually addressable first reset select inputs, and (ii) individually addressable second reset select inputs;
an array of pixels comprising:
  photodiodes;
  floating diffusion nodes;
  transfer transistors connecting the photodiodes to the floating diffusion nodes, wherein the transfer transistors are individually selectable by a combination of the first transfer select inputs and second transfer select inputs;
  reset transistors connected between one or more potentials and the floating diffusion nodes, wherein the reset transistors are individually selectable by a combination of the first reset select inputs and the second reset select inputs; and
  reset selection transistors comprising a first reset selection transistor having a gate terminal connected to (i) a first reset select input of the first reset select inputs or (ii) a second reset select input of the second reset select inputs, and the first reset selection transistor also being connected between (1) a gate terminal of one of the reset transistors and (2) the other of (a) the first reset select input or (b) the second reset select input;
  output transistors in a source-follower configuration connecting the floating diffusion nodes to output nodes; and
a controller configured to control the at least one transfer selection control circuit to expose:
  (i) a first pixel of the array of pixels for a first length of time, and,
  (ii) a second pixel of the array of pixels for a second length of time, the second length of time being independent of the first length of time.

11. The CMOS sensor according to claim 10, wherein the first length of time is different from the second length of time.

12. The CMOS sensor according to claim 10, wherein the first length of time and the second length of time commence at different times.

13. The CMOS sensor according to claim 10, further comprising:
a multiplexer; and
a plurality of reading circuits, wherein:
  a first reading circuit is connected, during a first reading time, via the multiplexer to read a value on a first source-follower output, and
  a second reading circuit is connected, during a second reading time, via the multiplexer to read a value on a second source-follower output.

14. The CMOS sensor according to claim 13, wherein the second reading time is independent of the first reading time.

15. The CMOS sensor according to claim 10, wherein two pixels of the array of pixels are in the same row,
wherein at least a first pixel of the two pixels is exposed for a first exposure time, and
wherein at least a second pixel of the two pixels is exposed for a second exposure time, the second exposure time being independent of the first exposure time.

16. The CMOS sensor according to claim 10, wherein two pixels of the array of pixels are in the same column,
wherein at least a first pixel of the two pixels is exposed for a first exposure time, and
wherein at least a second pixel of the two pixels is exposed for a second exposure time, the second exposure time being independent of the first exposure time.

17. The CMOS sensor according to claim 10, wherein the photodiodes are arranged between the transfer transistors and a light source.

18. The CMOS sensor according to claim 17, wherein the light source is a light source of a spectrometer.

19. A CMOS sensor comprising:
at least one photodiode;
at least one floating diffusion node;
at least one output node;
at least one individually addressable first transfer select input;
at least one individually addressable second transfer select input;
at least one individually addressable first reset select input;
at least one individually addressable second reset select input;
at least one transfer transistor comprising a first transfer transistor connecting a first photodiode to a first floating diffusion node of the at least one floating diffusion node, wherein the first transfer transistor is individually selectable by a combination of: (i) one of the at least one first transfer select input, and (ii) one of the at least one second transfer select input;
at least one reset transistor comprising a reset transistor connected between one or more potentials and the first floating diffusion node, wherein the reset transistor is individually selectable by a combination of (i) a first reset select input of the at least one first reset select input, and (ii) a second reset select input of the at least one second reset select input;
at least one reset selection transistor comprising a first reset selection transistor having a gate terminal connected to (i) the first reset select input or (ii) the second reset select input, and the first reset selection transistor also being connected between (1) a gate terminal of the reset transistor and (2) the other of (a) the first reset select input or (b) the second reset select input; and
at least one output transistor in a source-follower configuration connecting the at least one first floating diffusion node to the at least one output node.

20. The CMOS sensor according to claim 19, further comprising:
at least a first transfer selection transistor having a gate terminal connected to (i) one of the at least one first transfer select input, or (ii) one of the at least one second transfer select input, the first transfer selection transistor also being connected between (1) a gate terminal of the first transfer transistor, and (2) the other of: (a) the first transfer select input, or (b) the second transfer select input.

21. The CMOS sensor according to claim 20, further comprising:
a second transfer selection transistor, the second transfer selection transistor having a gate terminal connected to a complementary transfer select input that is a complement of (i) one of the at least one first transfer select input or (ii) one of the at least one second transfer select input, the second transfer selection transistor also being connected between (i) a gate terminal of the first transfer transistor, and (ii) one or more potentials.

22. The CMOS sensor according to claim 19, further comprising:
a second reset selection transistor having a gate terminal connected to a complementary reset select input that is a complement of (i) the first reset select input, or (ii) the second reset select input, the second reset selection transistor also being connected between (i) the gate terminal of the reset transistor, and (ii) one or more potentials.

23. The CMOS sensor according to claim 19, further comprising:
at least a first transfer selection transistor having a gate terminal connected to one of (i) the at least one first transfer select input, or (ii) the at least one second transfer select input, the first transfer selection transistor also being connected between (i) a gate terminal of a first transfer transistor, and (ii) the other of (a) the at least one first transfer select input or (b) the at least one second transfer select input.

24. The CMOS sensor according to claim 19, further comprising:
at least one anti-blooming transistor.

25. A spectrometer system comprising:
a CMOS sensor according to claim 19.

26. The CMOS sensor according to claim 19, further comprising:
at least one transfer selection control circuit configured to (i) individually address the at least one first transfer select input, and (ii) individually address the at least one second transfer select input.

27. The CMOS sensor according to claim 19, further comprising:
at least one reset selection control circuit configured to (i) individually address the at least one first reset select input, and (ii) individually address the at least one second reset select input.

28. A CMOS sensor comprising:
at least one output;
at least one transfer selection control circuit configured to control (i) individually addressable first transfer select inputs, and (ii) individually addressable second transfer select inputs;
at least one reset selection control circuit configured to control (i) individually addressable first reset select inputs, and (ii) individually addressable second reset select inputs;
an array of pixels comprising:
photodiodes;
floating diffusion nodes;
transfer transistors connecting the photodiodes to the floating diffusion nodes, wherein the transfer transistors are individually selectable by a combination of the first transfer select inputs and the second transfer select inputs;
reset transistors connected between one or more potentials and the floating diffusion nodes, wherein the reset transistors are individually selectable by a combination of the first reset select inputs and the second reset select inputs;
reset selection transistors comprising a reset selection transistor having a gate terminal connected to (i) a first reset select input of the first reset select inputs or (ii) a second reset select input of the second reset select inputs, and the reset selection transistor also being connected between (1) a gate terminal of one of the reset transistors and (2) the other of (a) the first reset select input or (b) the second reset select input;
output transistors in a source-follower configuration connecting the floating diffusion nodes to the at least one output; and a controller configured to control the at least one transfer selection control circuit to expose:
(1) a first pixel of the array of pixels for a first length of time, and,
(2) a second pixel of the array of pixels for a second length of time, the second length of time being independent of the first length of time.

29. The CMOS sensor according to claim 28, wherein the first length of time is different from the second length of time.

30. The CMOS sensor according to claim 28, wherein the first length of time and the second length of time commence at different times.

31. The CMOS sensor according to claim 28, further comprising:
a multiplexer; and
a plurality of reading circuits, wherein:
a first reading circuit is connected, during a first reading time, via the multiplexer to read a value on a first source-follower output, and
a second reading circuit is connected, during a second reading time, via the multiplexer to read a value on a second source-follower output.

32. The CMOS sensor according to claim 31, wherein the second reading time is independent of the first reading time.

33. The CMOS sensor according to claim 28,
wherein a first pixel and a second pixel are in a first row,
wherein at least the first pixel is exposed for a first exposure time, and
wherein at least the second pixel is exposed for a second exposure time, the second exposure time being independent of the first exposure time.

34. The CMOS sensor according to claim 28,
wherein a first pixel and a second pixel are in a first column,
wherein at least the first pixel is exposed for a first exposure time, and
wherein at least the second pixel is exposed for a second exposure time, the second exposure time being independent of the first exposure time.

35. The CMOS sensor according to claim 28, wherein the photodiodes are arranged between the transfer transistors and a light source.

36. The CMOS sensor according to claim 35, wherein the light source is a light source of a spectrometer.

* * * * *